United States Patent
Filser et al.

(10) Patent No.: US 9,591,113 B2
(45) Date of Patent: Mar. 7, 2017

(54) ADAPTOR ENABLING AN ELECTRONIC COMMUNICATION DEVICE WITH ADDITIONAL FUNCTIONS

(71) Applicant: NEXPACK LIMITED, Hong Kong (CN)

(72) Inventors: Frank Thomas Filser, Hong Kong (CN); Hubertus Friedrich Wasmer, Oberengstringen (CH); Lech Alexander Murawski, Munich (DE)

(*) Notice: Subject to any disclaimer, the term of this patent is extended or adjusted under 35 U.S.C. 154(b) by 0 days.

(21) Appl. No.: 14/909,740

(22) PCT Filed: Aug. 11, 2014

(86) PCT No.: PCT/IB2014/063840
§ 371 (c)(1),
(2) Date: Feb. 2, 2016

(87) PCT Pub. No.: WO2015/022615
PCT Pub. Date: Feb. 19, 2015

(65) Prior Publication Data
US 2016/0191682 A1  Jun. 30, 2016

Related U.S. Application Data

(60) Provisional application No. 62/007,407, filed on Jun. 4, 2014.

(30) Foreign Application Priority Data

Aug. 12, 2013  (DE) .................. 10 2013 108 715
Aug. 12, 2013  (DE) .................. 10 2013 108 716

(51) Int. Cl.
| | | |
|---|---|---|
| H04B 1/38 | (2015.01) | |
| H04M 1/02 | (2006.01) | |
| H04M 1/725 | (2006.01) | |

(52) U.S. Cl.
CPC ....... *H04M 1/0274* (2013.01); *H04M 1/0254* (2013.01); *H04M 1/72527* (2013.01); *H04M 1/72575* (2013.01)

(58) Field of Classification Search
CPC .. H04M 1/0249; H04M 1/026; H04M 1/0274; H04M 1/72527; H04M 1/0254
(Continued)

(56) References Cited

U.S. PATENT DOCUMENTS

| | | |
|---|---|---|
| 5,625,673 A | 4/1997 | Grewe et al. |
| 6,396,416 B1 | 5/2002 | Kuusela et al. |
| 2010/0184482 A1 | 7/2010 | Ijas et al. |
| 2012/0161705 A1* | 6/2012 | Huang .............. G06F 1/26 320/115 |
| 2015/0133204 A1 | 5/2015 | Ivanovski |

FOREIGN PATENT DOCUMENTS

| | | |
|---|---|---|
| CN | 1263292 | 8/2000 |
| CN | 2917005 Y | 6/2007 |

(Continued)

*Primary Examiner* — Keith Ferguson

(57) ABSTRACT

The invention relates to an adaptor for an electronic communication device. The adaptor enables the electronic communication device to perform additional functions based on the needs of users. The adaptor has a frame for coupling to the electronic communication device and various packages with different functions. The packages are exchangeable/replaceable with other packages of different functions. Useful data can be captured by the packages and the data can be used for subsequent analysis or distribution.

22 Claims, 13 Drawing Sheets

(58) Field of Classification Search
USPC ...... 455/557, 550.1, 558, 556.2, 572, 575.1,
455/90.1–90.3, 422.1, 403, 426.1, 426.2,
455/41.1–41.3; 379/428.01, 428.04,
379/433.09, 433.1, 450; 361/679.41
See application file for complete search history.

(56) References Cited

FOREIGN PATENT DOCUMENTS

| | | | |
|---|---|---|---|
| CN | 2932746 | Y | 8/2007 |
| CN | 200941481 | Y | 8/2007 |
| CN | 201063805 | Y | 5/2008 |
| CN | 201113102 | Y | 9/2008 |
| CN | 202444525 | | 9/2012 |
| CN | 202888879 | U | 4/2013 |
| CN | 203386125 | U | 1/2014 |
| CN | 203521723 | U | 4/2014 |
| CN | 203522841 | U | 4/2014 |
| CN | 203839651 | U | 9/2014 |
| DE | 29521017 | U1 | 7/1996 |
| DE | 1996132197 | A1 | 2/1998 |
| DE | 29806392 | U1 | 7/1998 |
| DE | 19713965 | A1 | 10/1998 |
| DE | 102009011638 | A1 | 9/2010 |
| EP | 1381205 | | 1/2004 |
| KR | 20100012233 | | 2/2010 |
| WO | 9312604 | A1 | 6/1993 |

\* cited by examiner

102

Perspective View

Side View

120

Side View

ADAPTOR ENABLING AN ELECTRONIC COMMUNICATION DEVICE WITH ADDITIONAL FUNCTIONS

CROSS-REFERENCE TO RELATED APPLICATION

This application claims benefit under 35 U.S.C. §119(e) of U.S. Provisional application having Ser. No. 62/007,407 filed on Jun. 4, 2014, which is hereby incorporated by reference herein in its entirety. This application also claims priority from the German Application with application Ser. No. 102013108715.9 filed on Aug. 12, 2013 and German Application with application Ser. No. 102013108716.7 filed on Aug. 12, 2013, which is hereby incorporated by reference herein in its entirety.

FIELD OF INVENTION

This invention relates to an adaptor for an electronic communication device, and in particular an adaptor with add-on functions to the electronic communication device.

BACKGROUND OF INVENTION

In general, a device is limited to certain functions that its original hardwares provide. This restricts the usefulness, flexibility and customize-ability of the device. Some mobile devices may encompass a mechanical coupling device, which is laid out for positive-fit coupling of a rear-side.

For example, patent application with publication no. DE 195 20 947 A1 describes in a general manner a personal computer, which displays the design of a flip-open laptop with alphanumeric keyboard and monitor and which is designed as a telecommunication device combining the functions of a telephone, radio or data transmission device. In addition, it has an interface for memory cards. Monitor and keyboard of the computer are connected with a pivot function on its longitudinal side and overlap each other in the closed position.

For example, a power supply designed in the same size as the general device is disposed flush with the rear side of the computer section.

As such the lack of individual adaptability (customize-ability) of the mobile device to individual requirements of the user presents a disadvantage. The user is forced to select expansion components and connect them via an external interface, according e.g. to the so-called USB-standard, to the mobile device by means of mechanical, electrical and signal technology. Subsequently, the user must load software suitable for the expansion component into the processor of the mobile device via e.g. a software drive of the mobile device. But a disadvantage still remains in that the installation is troublesome and the user has to handle two mechanically distinct devices.

Personal computers can be customized to the personal requirements of the user through expansion cards and thus be upgraded to serve additional functions, whereby the expansion cards are solidly and removably connected to the computer and they are slotted, bolted or inserted into the motherboard mostly in the interior of the device housing.

Mobile communication devices, e.g. so-called PDA's and smart phones can be placed on or in a holder and then docked to an interface of an expansion component using a cable connection or by wireless means. All the holders share the feature that they serve to hold the mobile device or the expansion component at a particular location determined by the user and that they enclose the mobile device or the expansion component. As an option, holders can also feature additional functions as the power supply for the mobile device or additional external interfaces.

One skilled in the art may understand that smart phones offer possibilities of customer-specific hardware adaptation, which can be divided into the following three categories: expansion via wireless interfaces, expansion via connections conducting electricity and passive elements as housings, replaceable housing covers and protective sleeves.

Wireless interfaces such as Bluetooth, WiFi, infrared and others do not transmit energy or power and hence a second battery or a second charging unit is required.

Connections conducting electricity, such as audio connection via headphone plug, USB, firewire or others, result in a large, external, clumsy and mechanically unstable attachment especially via cable, and thus there is a risk of breaking off a plug.

Smart phones feature a display screen and a hard or soft keyboard on the front side. The other surfaces are either hardly or not utilized at all and lie fallow. For example the rear side in numerous smart phones is hardly used, except having solely the camera lens and a flash light.

It is also widespread to place a mobile device in a protective sleeve. The purpose of protective sleeves is to protect mobile devices against mechanical, physical, chemical or electromagnetic damage and they encompass the mobile device wholly or at least partially.

SUMMARY OF INVENTION

In the light of the foregoing background, it is an object of the present invention to provide a technically simple expansion option for a mobile device, but at the same time improves its handling in the expanded condition. Particularly provided here is a mobile device and at least an expansion component, which will expand the mobile device by individual hardware functionalities desired by the user and still allows simple handling of the overall array.

Accordingly, the invention is an adaptor for an electronic communication device, including a frame which further includes: a connection module for connecting the adaptor to the electronic communication device; and a plurality of docking areas disposed on the frame, each of the docking area further including: a space having a space unit with a predetermined size and a predetermined shape; an anchoring mechanism; and an electrical interconnection site. The space is adapted to receive a package with an attachment mechanism for docking with the frame via the anchoring mechanism. The package having a size and a shape of at least one of the space unit. The electrical interconnection site is configured to couple with the package when the package is docked into the docking area. The connection module is configured to establish a connection interface between the package and the electronic communication device. The adaptor provides universal docking of the packages thereby enabling a user to add at least one desired function to the electronic communication device.

In one embodiment, the frame further includes a fastening mechanism configured to couple the adaptor to the electronic communication device.

According to another aspect of the present invention, the present invention is a package adapted for coupling to at least one of a plurality of docking areas of a frame which is a part of an adaptor that is able to be connected to an electronic communication device and is capable of adding at least one desired function to the electronic communication device via the adaptor. Each of the docking areas having a space with a space unit with a predetermined size and a predetermined shape. The package includes: a housing including an attachment mechanism for coupling to the at least one docking area of the frame; electronic components housed within the housing for realizing the desired function; and a connection interface for electrically connecting the package to the frame. The housing has a size and a shape of at least one of the space unit so that different volume and amounts of the electronic components are able to be housed therein to provide maximum flexibility by allowing the same frame to be used for packages of multiple sizes having varying functionalities.

In one embodiment, the package further includes: a plurality of sensors housed within the housing and configured to measure physiological data of a user and environmental data; and a storage unit configured to store the physiological data and the environmental data.

In another embodiment, the package further includes a data communication module housed within the housing and is configured to send the physiological data and the environmental data to a centralized cloud server for analysis or share upon connection with the electronic communication device which is linked to a data communication network.

The present invention, in the third aspect, is a method for adding desired functions to an electronic communication device. The method includes the steps of: providing an adaptor including a frame which further includes a connection module for connecting the adaptor to the electronic communication device and a plurality of docking areas, including a space with a space unit with a predetermined size and a predetermined shape; an anchoring mechanism; and an electrical interconnection site, disposed on the frame; providing at least one package, having size and shape of at least one space unit, with an attachment mechanism for docking with the frame via the anchoring mechanism and electronic components for realizing the desired function; inserting the at least one package into the docking area via the anchoring mechanism; electrically connecting the at least one package to the frame; establishing a connection between the at least one package and the electronic communication device via the connection module; and realizing the desired function in the electronic communication device. Therefore, a user can increase the functionalities of the electronic communication device with maximum flexibility and efficiency.

The present invention, in another aspect, is a method for providing at least one desired function to an electronic communication device by providing a frame, which is a part of an adaptor configured to be connected with the electronic communication device and is capable of adding at least one desired function to the electronic communication device via the adaptor, which includes a plurality of docking areas including a space with a space unit of a predetermined size and a predetermined shape, and anchoring mechanism and an electrical interconnection site. The method includes the steps of: selecting a desired function to be added to the electronic communication device; selecting components that are required to realize the desirable function; determining amount of space required to hold the components; selecting a package housing, including an attachment mechanism for docking with the frame via the anchoring mechanism, having an internal volume larger than the amount of space and a size and a shape of at least one of the space unit; assembling the components into the package housing thereby form a package; establishing an connection interface between the package and the electronic communication device via the electrical interconnection site; and realizing the desired function in the electronic communication device. Therefore, a user can increase the functionalities of the electronic communication device with maximum flexibility and efficiency.

There are many advantages to the present invention. By simply coupling the adaptor to the electronic communication device, the electronic communication device can obtain extra functions. Moreover, the packages can be exchanged or replaced by other packages with different functions, resulting in higher flexibility and customiz-ability. Various packages can communicate with each other and thus they can be configured to perform a complex function. As the packages can have their own processors, the electronic communication device can still have a good performance but obtains additional functions. The processor of the package can be utilized by the electronic communication device to perform different tasks and hence the overall processing speed increases.

Another advantage of the present invention is that the packages can be equipped with different sensors that are able to capture various data from a user or the environment. The data collected can be used for subsequent analysis and sharing.

Furthermore, the adaptor and the packages are separate hardware which can be provided by different parties. In other words, one party can provide the backbone, module and the software, whereas other parties can produce packages with specific hardware and software, yet still compatible with the backbone provided.

BRIEF DESCRIPTION OF FIGURES

FIG. 11b is a side view of the frame of the adaptor in the same exemplary embodiment as FIG. 11a.

DETAILED DESCRIPTION OF THE PREFERRED EMBODIMENTS

Figure 1:
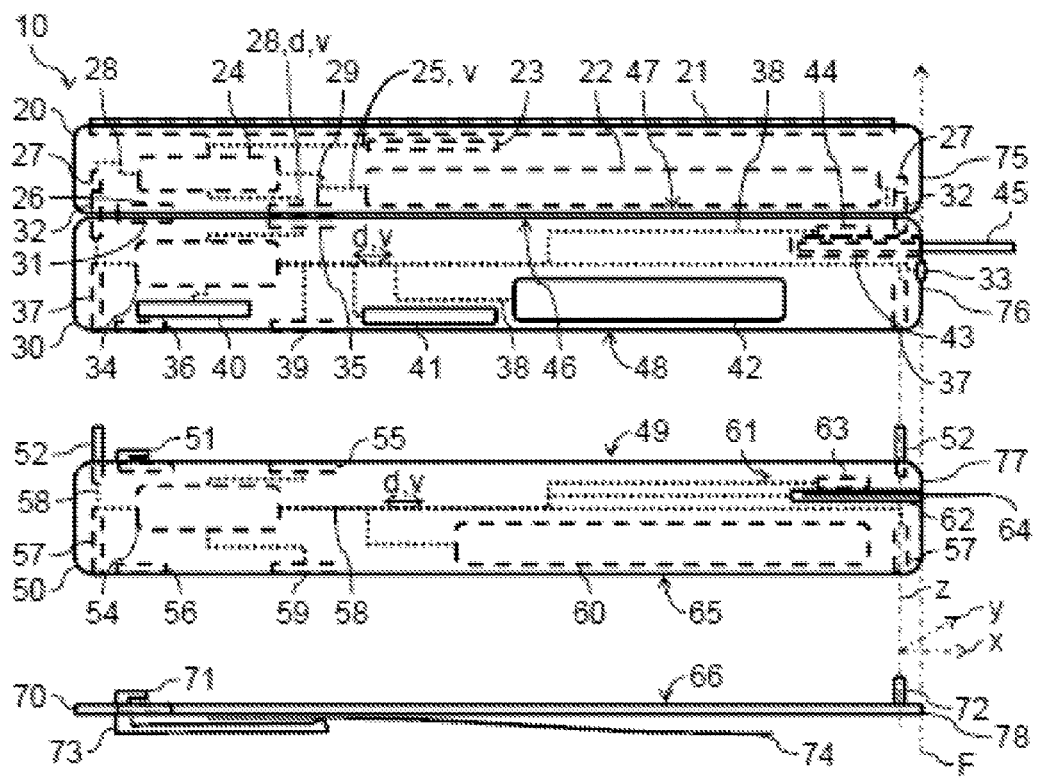
FIG. 1 is a side view of a mobile device and several device components coupled to it, which expands the mobile device by additional functionalities and/or hardware, wherein the components disposed in the interior are shown as dashed.

As used herein and in the claims, "comprising" means including the following elements but not excluding others.

As used herein and in the claims, "couple" or "connect" refers to electrical coupling, mechanical coupling or a combination of both. The connection can either be a direct connection via one or more electrical means or mechanical means or an indirect connection through wireless means.

As used herein and in the claims, an "electronic communication device" refers to any device with a processor to perform certain functions, with a connection interface for connecting to external devices and/or with capability of connecting to a data communication network and/or with an electronic interface for communication with a user. Examples of an "electronic communication device" include a mobile device such as a smartphone, a portable tablet computer, a laptop, a smart watch, a necklet and a wristband, etc.

Detailed description of the invention will be explained below. The present invention has different configurations and different usages. The specific configuration and usage can be selected based on actual needs.

In the following description, "device component" and "adaptor" are used interchangeably, both of them referring to an add-on device capable of coupling to an electronic communication device for adding function(s) to the electronic communication device. Moreover, "functional component" and "package" are used interchangeably, both of them referring to a physical module detachable from the "device component" or "adaptor" for realizing an additional function in the electronic communication device.

In one embodiment, the invention relates to a mobile device, a device component therefor and a process for operating a mobile device with a device component coupled thereto.

In another embodiment, the invention is a mobile device, particularly a mobile communication device or a mobile computer, with a processor, an interface arrangement designed as plugin connection, which is laid out to transmit to and receive at least one of signals and data from an external device connected with the aid of a cable and mating plug.

In yet another embodiment, the invention relates to mobile devices, or mobile computers with one or several inherent components for wireless exchange of at least one of signals and data in an external device equipped with a wireless communication device for this purpose.

This periphery side of the mobile device can at the same time or alternatively be one side of the mobile device, disposed on the opposite side from one of the display devices and/or one of the input devices. This side is for example a rear side of a mobile radio device, a computer with a hinged screen or a so-called tablet computer. On the information presentation side, the display device is particularly laid out as a flat screen or a touch-sensitive screen, which is also generally described as a touch screen. The input device at least features an operating element and is for example designed as a mechanically operable keyboard or as a surface-sensitive keyboard which is a so-called touch screen.

The particular purpose of the additional device component is to expand the mobile device by at least one functionality and/or hardware component with special functionality.

The provision of numerous differing device components allows the mobile device to be expanded by a corresponding variety of functionalities and device features.

Therewith, the coupling is particularly a removable coupling and particularly a geometrical and/or mechanical coupling with the aid of a sliding or snap-in arrangement.

The preferable mechanical coupling warrants a solid connection using simple means, for example with pivoting elements, tongue-and-groove connections or snap-in connections.

But aside and beyond that, magnetic or pneumatic coupling elements are also understood to be equally suitable, because they also serve as a solid coupling attachment of the mobile device and the device component in the sense of mechanical coupling.

The preferred rigid coupling also means that the coupling section of the device component, especially in the case where the device component is adjustable in itself, is fixedly attached in relation to the mobile device or its coupled components. Thus, a physical unit is created, which based on its form remains a unitary integrated component and is movable as such. This prevents a spatially undefined accompanying movement because of a cabled connection between the device component and the mobile device.

The device component in question is thus for example a standard rear-side housing cover with a replaceable functional component which expands the mobile device by at least one additional functionality, which is particularly a hardware functionality, and this functionality does not only cover the components accessible from the rear such as a battery or a SIM-card (i.e. a subscriber identification module card).

The interface arrangement is laid out in a manner that it allows to connect at least one additional device of independent construction, i.e. functional component, and exchange signals or data at least in one direction.

Signals and data can be transmitted in analog or digital form depending on the design. This does not only have to involve a transmission of information or measured values, but also a transmission of files and/or source texts, for example software or drivers, which will allow the processor of the mobile device to access functionalities of the coupled device components. In addition, current or voltage can be conducted through such interfaces if required.

Instead of a passive rear-side cover, the mobile device will be particularly expanded by a device component, which will particularly equip the mobile device with active hardware components and/or software functions.

The mobile device in question is particularly an independently wholly functioning device. It can be expanded by the device components in order to feature additional functions and/or hardware being in a coupled mode with the connected components. It is advantageous that the functional components do not anymore require to be joined with the mobile device by the means of an external interface respectively sitting at the external sides of the mobile device which, for example, are interfaces based on the so-called USB-standard, by mechanical, electric, signal-technical and IT-wise means, such that these (implies in German language: functional components and/or interfaces) will not always stand out from the side of the housing of the mobile device, or even have to be carried around with a loose cable connection or defect-prone radio connection, in the way of more or less separate components. In the coupled mode, a compact unit is provided, which ensures that the mobile device together with the expansion components is one single integrated unit. In particular this allows the expansion of the mobile device by individual hardware functionalities selected by the user of the mobile device and still enable a simple handling of the overall arrangement. In addition to an electrical connection, the coupled mode provides a mechanically stable connection between the mobile device and at least one of the device components and also warrants high transmission reliability, but yet it is simple to disconnect. When it is not in a coupled mode, the device component can still function on its own provided that there is energy and power and a processor which is tasked to take over control.

The mobile device is particularly a telecommunication device and/or a computerized device, e.g. a smart phone, a mobile phone, a tablet computer, a notebook, laptop or other hand-held devices.

Furthermore, a device component with an interface arrangement is also provided, which is laid out to transmit at least one of signals and data, with a coupling device which is particularly laid out for mechanical and/or rigid coupling of a housing part of the device component at a side/surface of a mobile device, and with at least a functional component, whereby the interface arrangement is thus laid out to control at least one such functional component of the device component with the aid of a processor of the mobile device coupled via a coupling device, and/or whereby the interface arrangement is laid out to transmit at least one of the signals and data by the mobile device coupled via a coupling device.

The device component therewith particularly represents a hardware expansion of a mobile device. The hardware expansion is therewith particularly understood that additional functions are accorded to the mobile device and/or additional hardware such as functional components are added. In general, the additional functions are functions that the mobile device was not equipped prior to coupling of the device component, or functions that the mobile device was equipped with but are not satisfactory to the user. With the current inventions these functions either not there or not satisfactory there can be added on the device component or exchanged.

Thus, the device component provides an active component and/or functionality. As opposed to passive, it means that the mobile device is enabled to control or read out components, particularly electronic components such as sensors, processors or actuators in the device component. Thus, the present invention provides active components contrary to those passive components with pure housing parts and other components without their functionalities that can be driven by the mobile device. Passive components, e.g. a makeup powder container, shall be included in the current invention and can be packages, too. Passive and active packages can be mixed to attach to the device component.

In this sense, a direct coupling joining the mobile device with the device component is preferred. However, it is not excluded that a passive adapter, e.g. adapter ring, is introduced between the mobile device and the device component or an additional device component, as long as the adapter is particularly laid out as mechanical and/or rigid coupling arrangement. In case of interface arrangements, which particularly transmit signals or data with the aid of radio (waves) or induction, such adapter does not have to be equipped with its own interface components. Such an adapter is a coupling device allocated to the mobile device and/or the device component. Correspondingly, such a coupling device can also consist of embracing elements, such as clips.

In another embodiment, a housing of the device component can be wholly enclosed, so that all the housing walls are designed as closed. But it is also possible that individual or all the housing walls are entirely or partially open. The same applied to the packages. Correspondingly, the housing part of the additional device component preferably has enclosed housing walls with contact elements to create the electrical interface and constructive elements to create a coupling device. However, when the external coupled device component does not feature a closed wall on the side facing the mobile device, this housing part can have the form of a frame or ledge shape.

In yet another embodiment, the invention comprises a device component with a first coupling device whose first coupling side is coupled to a mobile device side of a mobile device and a second coupling device coupled to a second coupling side (48; 65) of the device component. The second coupling device is laid out for coupling an additional device component to the first coupling device.

In another embodiment, the invention comprises a device component with an interface arrangement, which is designed as the first interface arrangement at a first coupling side of the device component facing the mobile device and with a second interface arrangement at a second coupling side of the device component. The second interface arrangement is designed to maintain contact with a first interface arrangement of an additional device component of the same fashion, at its first coupling side.

The second coupling device and the second interface arrangement thus serve as the coupling spot for coupling an additional device component. In addition, the rear-wall cover of the mobile device, if required, is removed from the mobile device in order to couple the first device component. This particularly also allows for a stacking arrangement of several device components, which can be attached to the mobile device as a stack. Even though it causes the mobile device to become somewhat clumsier, it allows for extension by a number of various functionalities.

In an additional embodiment, the invention comprises a mobile device and a device component, whereby the processor and the interface arrangement are laid out to control at least two device components coupled and stacked on top of each other via the coupling device and/or to receive at least one of signals and data from at least two device components coupled and stacked on top of each other via the coupling device.

The preference with such external device components is for them to be replaceable as desired. It is also preferable to be able to replace a whole sequence of device components attached as a stack to the mobile device as desired. In accordance with a further embodiment, the electrical connections for the transmission of data, signals and/or current/voltage are shuttled through such individual device components, in order to be able to access all or freely selected device components arranged in a stack and their functional components or functions, from the mobile device via its processor.

Mechanical components for coupling of an external device component to the mobile device can also be preferably coupled to other such device components. To this end, the device components feature corresponding coupling mechanisms and interfaces particularly on the opposing side, in the same way as provided on the coupling side of the mobile device. One can also particularly utilize exterior clips or sliding connectors in the fashion of a tongue-and-groove connector.

Aside from embodiments of the coupling sides of the mobile device and the device components, there are also advanced developments provided, particularly in which a circumference edge partially encompasses the exterior edge of the component disposed on the opposing side. For example, a circuitous circumference wall of the mobile device can be laid out with an offset towards its coupling side, in order to accommodate a correspondingly jutting out circuitous wall of the device component. In such a case, the circuitous wall of the device component should also feature an offset in its section disposed opposite the jutting out section, in order to allow the attachment of further device components of the same design to this device component.

It is also possible to provide an embodiment of a mobile device or a device component, in which the interface arrangement is designed to conduct supplied voltage and/or supplied current between the mobile device and at least one device component coupled via the coupling device.

Another advantageous embodiment of such a mobile device or such a device component is represented by equipping them with a processor, which is arranged and laid out in connection with at least one interface arrangement of the device component and at least one functional component, controlling the functional components in dependence on the instructions of a processor of a coupled mobile device, and/or which has the embodiment for controlling the functional components of such device component being switched downstream.

To this end, the processor can be connected via bus-connections to the individual functional components and interfaces. However, the processor can also be switched directly between them. It is particularly provided that processors of device components do not hinder the activity of the processor of the mobile device, but that central control of the overall array of the mobile device and at least one coupled device component rests on the processor of the mobile device. Prospective processors of device components primarily serve as support for the processor of the mobile device.

In a further embodiment, the invention is a device component, which is equipped with at least one functional component controllable by a mobile device. The functionality of the device component can be selected, but not limited from the group of a blood-work determination device, a card reader, particularly a debit-card reader, a breath and/or blood alcohol analysis device, a device detecting and/or analyzing physical and/or chemical values, particularly electrical measurement values, temperature, pressure, gas, humidity and/or liquid detecting device and/or liquid detection device and/or temperature, pressure, gas, humidity and/or electrical measurement values, liquid detecting device, an image-generating device, particularly endoscopic device, a cryptography function device, a printer, a fingerprint scanning device, an acceleration-measuring device, a roughness-measuring device, a position, disposition and/or distance-measuring device and a light source, particularly laser light source.

It is, for example, advantageous that a waiter in a restaurant who attaches a special device component to his mobile device, which features a debit/credit card function, can settle the bills with the guests using credit cards or other bank cards. An additional device component for a waiter can for example be provided with a supplemental device, which establishes communication with the kitchen or the bar, in order to automatically transmit a customer order being placed to them. Another exemplary embodiment is, for instance, that the device component is equipped with a sensor device for a chimney sweep operation which carries out physical measurements in order to perform a gas analysis, leak pressure measurement, humidity measurements or temperature measurements. As an option, device components can also be provided, to which an endoscope for visual observations in inaccessible spots is attached. Device components could for example be provided to construction workers, which allow them to carry out distance measurements using laser or ultrasound, or feature humidity sensors to be able to measure humidity content of goods in the construction, in the domain of corn storage, or in the domain of lumber processing.

A further device component can for example be provided to persons, who have to monitor their personal medical values, for instance any chronic diseases, for instance blood pressure or blood-sugar content. It is advantageous that the users of the mobile device can couple and uncouple different device components to/from their mobile device according to their individual needs during recreational activities or at work.

In an additional embodiment, the invention comprises a device component, in which the coupling device features a coupling device component side for particularly flush coupling of the device component to a coupling side of a mobile device, whereby the sides of the device component adjacent to the coupling device component side of such a mobile device, which are adjacent to such a coupling mobile device side, are designed to be disposed in alignment at least among its adjoining parts.

In addition, a system preferable includes such a mobile device and at least one such device component coupled or with the ability to couple to it.

Such a device component can incorporate one or several functions, hardware expansions or functional components. For this purpose, sensors and actuators can be miniaturized and geometrically interleaved, whereby it is preferable that electrical lines are run to each sensor and each actuator.

In accordance with a preferred expanded embodiment, the mobile device and/or such a device component can feature a device, which does not solely provide a rigid construct in its general layout, but provides an adjustable, particularly jointed or pivoting embodiment. Such a device can particularly be laid out via the coupling section, particularly via the coupling section itself. It particularly enables to hinge, pivot, slide and/or turn at least one section of the device component in relation to the coupled mobile device. In general this also allows a translational and/or rotational relative shifting of the device component and mobile device with the aid of mechanical elements. The mechanical coupling components or coupling sections will be equipped with appropriate interfaces for electrical contacts, if required via inductive coupling, in order to warrant the transmission of data and/or signals and energy if so required, independently of the set position between the mobile device and coupled device component.

In particular, the underside of a device component closing up the overall arrangement consisting of the mobile device and at least one device component can also be equipped with various non-digital display elements or devices, in order to hold a photograph or jam in a piece of paper. For example a spring clip can be laid out on the rear-side surface of the device component.

In addition, there is a preferable process for operating such a mobile device and at least one device component coupled to it, in which the functional component of the device component is controlled with the aid of the processor of the coupled mobile device, and/or in which the functional components of the device component transmits at least one of the signal and data to the mobile device and it is processed in the mobile device.

In another embodiment, after coupling the device component to the mobile device, or after an activation of a functional component as data, software for operating the functional component is loaded from the device component to the mobile device, or its processor.

Controlling thus also particularly encompasses a data transfer. If required, prior software is saved in the device component as a driver for the device component. In particular, it allows the device component to be equipped with software specific to its functionality and compatible to run in the mobile device as a computer processor program.

Under the ideal circumstances, the transfer of software is only performed once when the device component is initially coupled to the mobile device. At that time, a driver is loaded from the device component to the mobile device so that the device component is therewith logically connected to the mobile device and thus the device component becomes controllable. Subsequent updates are then preferably loaded from an external data source that is from an external provider if required, or over a network that is publicly accessible.

This will enable coupling a device component to the mobile device to perform measurements in aid of a sensor of the device component via the control of the processor of the mobile device.

Then the mobile device can capture data in aid of an application provided in the mobile device. The application can also be an application provided together with the device component. The data or data generated by processing can subsequently be saved, displayed, used to control other processes, or transmitted via networks to external devices.

In another embodiment, the invention remains the general layout of parts coupled to each other that can easily be handled and carried. The individual or joined device components have to have a size comparable to the mobile device. Overall arrays are preferred with a total weight of under 1.5 kg, particularly under 1 kg and particularly in case of mobile phones under 750 g, and particularly under 500 g. Correspondingly the overall sizes are preferred in a range, where the largest side length amounts to 500 mm, preferably less than 350 mm and particularly under 200 mm in case of mobile phones.

An example of embodiment will be explained in more detail in the following section. The various figures will show the same references to the same or equally functioning components and functional elements.

As shown in FIG. 1, a system 10 comprises a mobile device 20 and numerous device components 30, 50, 70, which can be coupled to the mobile device 20. It is possible to solely attach any one of these device components 30, 50, 70 to the mobile device 20, preferably couple several of these device components 30, 50, 70 stacked on top of each other, to the mobile device 20, or also to couple different such external device components to the mobile device 20.

The exemplary mobile device 20 shown is for example a mobile phone or a so-called smart phone which not only offers the option of communication over the mobile radio network but also offers features of a miniature computer. Access to the Internet is a part of the functions of the mobile device 20. The mobile device 20 features a housing, on which particularly its largest housing side (as coupling mobile device side 46) is disposed a display and/or operating controls 21. The display and/or operating controls 21 serve to display objects, texts or pictures as well as to display functional elements in the state-of-the art. In addition, it serves the entry of instructions, text or the activation of functions, which is also state-of-the art. The display and/or operating controls 21 preferably serve the use and particularly the control of additional functionalities, which are furnished by the coupled device components.

The mobile device features a battery 22 as power supply. Depending on the design of the external device components, they can also be supplied with power with the aid of the battery 22. It is also possible to use an external device component which by itself features a battery 42, or any other power supply that can charge the battery 22 of the mobile device 20 in coupled mode.

Particularly in case of design as mobile phone with access to the mobile radio network, the mobile device 20 also features a slot for inserting the identification card 23. The slot is used to insert a so-called SIM (subscriber identification module) card, which serves to identify the user of the mobile device 20 to the network operator.

A processor 24 in the mobile device 20 is used to control its functions and individual components. The various components of the mobile device 20 are connected to each other over wires 25, 28, in order to be supplied with supply voltage v and/or to exchange data or signals among each other. Thereby, the data and signals can be analog or digital depending on the design. Signals serve as a purpose of controlling components, or can take the form of signals furnished by the sensors, which serve to control the mobile device 20, or its functionalities. Data is particularly equipped with informational content, but can also represent the software source code. In addition, the data can contain digitalized signal values.

The exemplary presentation of the first device component 30 is shown in a mode coupled to the mobile device 20. As connection of the mobile device 20 and the first device component 30 particularly serve at least one coupling device 26 of the mobile device 20 and a first coupling device 31 of the device component 30 coupled to it. The coupling devices 26, 31 are for example laid out as elements sliding and/or snapping into each other, which allow a removable rigid mechanical connection of the device component 31 with the mobile device 20.

For coupling the device component 30 to the mobile device 20, the mobile device 20 additionally features an interface arrangement 27, which is shown in this example as a jack and allows for electrical contact with the internally disposed component of the mobile device 20, particularly its processor 24. Correspondingly, the device component 30 features a first interface arrangement 32, which is shown in this example as a plug. In coupled mode, the first interface arrangement 32 of the device component 30 and the interface arrangement 27 of the mobile device snap into each other in such fashion that an electrical contact for signal transmission, data transmission and power transmission is enabled. The first coupling device 31 particularly serves to maintain electrical contact of functional components 40, 41, 42, 44 of the first device component 30 disposed in the device component 30. Alternatively or particularly additionally, a contact to further device components 50 can also be maintained via the first interface arrangement 32 of the device component 30. They are attached as additional device components to the first device component 30. The second interface arrangement 37 of the first device component 30 is joined with the first interface arrangement 52 of the second device component 50, and the second coupling device 36 of the first device component 30 is joined with the first coupling device 51 of the second device component 50.

Such interface arrangements 27, 32 can in particular be designed in a manner to assume a mechanical connection of the mobile device 20 to the device component 30 coupled to it, additionally or alternatively to the coupling devices 26, 31.

Figure 2:
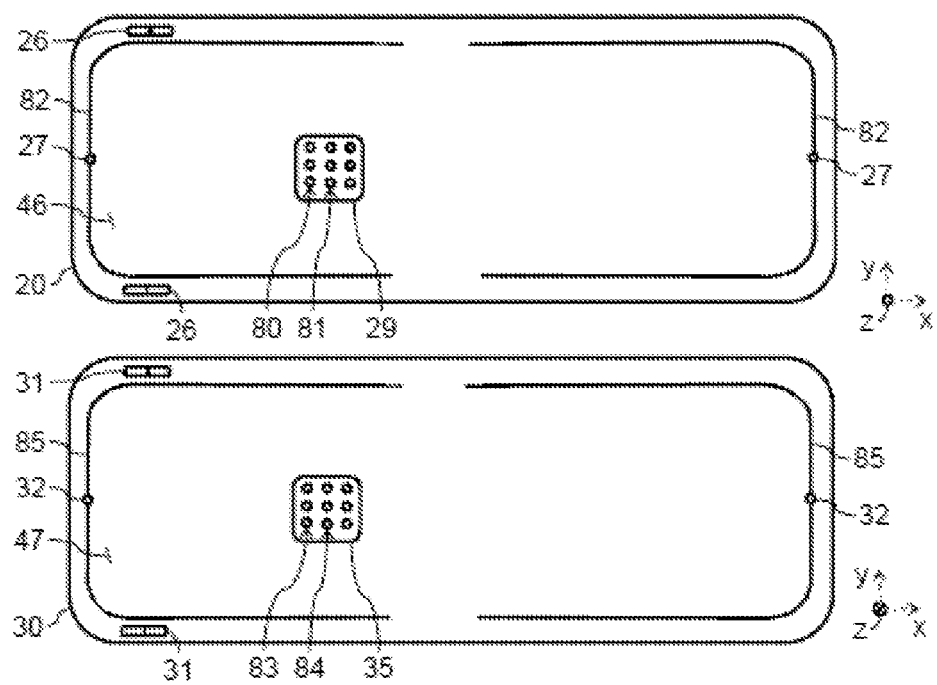
FIG. 2 is a top-down view of the bottom side of the mobile device and an upper side of a first device component.

As it is additionally outlined in FIG. 2, further interface arrangements 29, 35 of the device component 20, 30 can be laid out in alternative or addition in the mobile device 20, which will enable transmission of data, signals and/or a voltage supply. The individual interface arrangements 29, 35 can thereby also feature numerous interface contacts 80, 83 for power/voltage supply and/or numerous interface contacts 81, 84 for signal/data transmission.

In addition or alternatively to above-described interface arrangements and interface contacts, conductive paths or contact areas can also be run over the surfaces (being in coupled mode and disposed on top of each other) of the mobile device 20 or of the device component 30. They will then allow for surface contact among each other. A mobile device side 46 of the mobile device 20 features complete or partial contact lines 82 running around it. A first coupling side 47 of the first device component 30 features corresponding complete or partial contact lines 85 running around it so as to remain in contact with the contact lines 82 of the mobile device side 46 in coupled mode against each other.

The coupled device components 30, 50 preferably feature a processor 34, 54 respectively. These processors 34, 54 serve the independent and complete control of components and functionalities of the respective device components 30, 50. As an option, the processors 34, 54 can assume a solely supporting functionality and only control a part or all the components and functionalities of their device components and perform complete or partial evaluations for analyses, if required. In such a case, the processors 34, 54 serve to support the processor 24 of the mobile device and it is possible that the processor 24 of the mobile device 20 assumes all the controls and evaluations of components and function of the device components 30, 50 by itself. The device components also feature internal wiring 38, 58 to connect their components and interfaces.

FIG. 1 shows that the first device component 30 is already coupled with its first coupling side 47 to the mobile device side 46 (provided for coupling) of the mobile device 20. Two additional device components 50, 70 are presented below and serve as a replacement for the first device component 30, or for additional utilization in a stack mode, whereby the second device component 50 is attached to the first device component 30 and the third device component 70 is attached to the second device component 50. For this reason, a part of the device components 30, 50 is equipped with two coupling sides. Thus, in the first device component 30, the side disposed opposite the first coupling side 47, is designed as a second coupling side 48.

The second coupling side 48 is preferably designed in a comparable manner to the mobile device side 46 of the mobile device 20, designed for coupling. However, the second presented device component 50 features a second coupling side 65 disposed opposite its first coupling side 49. The second coupling sides 48, 65 preferably feature second coupling devices 36 and 56 respectively, which are adapted to couple the corresponding first coupling arrangements 31, 51, and 71 of another device components, or a function-free cover of the mobile device 20. The second coupling sides 48, 65 preferably also feature second interface arrangements 37, 39, 57, 59 for the transmission of signals, data d, current or supply voltage v, in keeping with the design of interface arrangements 27, 29 of the mobile device 20.

In such device components 30, 50 with a second coupling side 48, 65, their wiring and/or processors 34, 54 are preferably switched in a manner such that the processor 24 of the mobile device 20 preferably not only accesses the adjacent coupled device component 30, but also the additional device components 50 coupled to it so that it can receive data or signals from the additional device components 50.

It is particularly preferred that voltage, power, current, data or signals are conducted through these device components 30, 50 equipped with two coupling sides 47, 48, 49, 65 and also the additional device components.

Thus, in principle, in accordance with the presentation per FIG. 1, the second device component 50 with its first coupling device 51 and at least first interface arrangement 52, 55 can be coupled to the second coupling side 48 of the first device component 30 and is switchable in communication with the mobile device 20. In addition, the third device component with at least first coupling device 71 and a first interface arrangement 72 can be coupled with its first coupling side 66 to the second coupling side 65 of the second device component 50.

Thereby, the first interface arrangement 72 of the third device component 70, which does not feature any active functional components, can serve to close the wiring connections. Thus, for example, there is the option of designing a ring closure to two electrical contacts disposed opposite each other at the second coupling side 48, 65 of a coupled device component 50, via the two contacts of the first interface arrangement 72, which are connected together to conduct electricity.

The third device component is an example of a housing cover, which can be coupled to the mobile device 20 although it does not feature any specific functions. Thus, the cover covers coupling devices 26 and interface arrangements 27, 29 on the mobile device side 46, in order to protect them from damage.

The device components 70 can also carry passive components, for example a mechanical holding element 73, in order to jam a note sheet 74 at the device component 70. Preferably, the device components that can be coupled feature functional components 40, 41, 42, 44, 60 or 61, which assume an active function and expand the mobile device 20 by this function and hardware if required.

The first device component 30 features a functional component 40, which is designed as a memory card slot. Thus, the mobile device 20 can be expanded by memory, on which audio files, picture files and film files recorded with the mobile device 20 by the user can be saved for replaying them later with the mobile device 20. An additional exemplary function of the functional components 41 serves as subscriber identification card slot 41, so that a user can insert a second subscriber identification card and thus different users can alternatingly access the internet or make phone calls using their identifying information on the mobile device 20. Optionally, the mobile device 20 can generate several accesses to telecommunication networks simultaneously and parallel to each other, in order to enable it to establish a low-cost data connection via a first network provider and a low-cost telephone connection via a second network provider. Another example of functional components 42 is an additional battery, with the aim of being able to extend the operating time of the mobile device 20, or in order to be able to recharge the battery 22 located in the mobile device 20 by coupling the first device component 30. In another embodiment, an additional functional component 44 is designed as a card-reading device for bank or cash cards. It features a receptor slot 43 to accept corresponding cards 45, in order to enable the insertion of cards into the receptor slot 43 from the outside. The actual functional component 44 in form of corresponding reading module and/or evaluation module for bank or cash cards is disposed in the vicinity of the receptor slot 43.

Thus, for many users, the first device component 30 represents a generally interesting expansion option of the mobile device 20. However, very user-specific, even custom-order, or individually engineered device components can be provided.

Thus, the second device component 50 features for example a functional component 61, which is designed as a medical analysis component. It provides a receptor slot 62 for a test strip 64 and a sensor 63 which analyses a test stripe 64 inserted into the receptor slot 62. The test stripe 64 comprises a stripe, which can receive a blood drop on it, and subsequently will determine the sugar content in blood with the aid of sensor 63 and the electronics of the functional component 61. To support the functional component 61, a part of calculations or process steps can be performed by the processor 54 of the second device component 50 and/or by the processor 24 of the mobile device 20 since they are equipped with correspondingly suitable software and/or drivers.

In another embodiment, a location determining device of the kind of so-called GPS-module can be disposed in this module 50 as an additional functional component 60. This device component 50 will enable determining the position of the mobile device 20 and in case of medical emergency it automatically call for help via the mobile radio functionality of the mobile device 20 while providing the current position data.

Optionally, additional actuation elements 33, for example push-buttons or touch-sensitive elements can be laid out in the device components 30. Thus, the device components can also feature physical operating elements and actuators, switches and buttons. For example a manual confirmation can be performed with them, when a card 45 has been inserted into the receptor slot 43 of the card-reading device and a personal identification number should be confirmed.

Particular preference is granted to embodiments of the mobile device 20 and the device components 30, 50, 70, if they create a visually closed unit in the coupled condition. FIGS. 1 and 2 show the mobile device 20 disposed in one plane with its coupling mobile device side 46, which is spread by the first spatial coordinates x, y. Correspondingly, the device components 30, 50, 70 are coupled in one direction with a spatial coordinate z vertically to this plane, to the coupling mobile device side 46 of the mobile device 20, and same for another one of the device components 30, 50. Particularly four mobile device sides 75, which are adjacent to the coupling mobile device side 46 and are spread out in one plane of the third spatial coordinate z, are disposed longitudinally and parallel to an alignment line F. Correspondingly, the adjacent sides 76, 77, 78 of the device components 30, 50, 70 coupled to the mobile device 20 also stretch over planes, which are bisected by the third spatial coordinate z. These sides 76, 77, 78 are sides adjacent to the corresponding coupling device component sides, i.e. to the first coupling sides 47-49, 65, 66 of the device components 30, 50, 70. It is preferable that the device components 30, 50, 70 with their coupling sides 47-49, 65, 66 are of dimensions that the adjacent sides 76, 77, 78 are aligned in their length to the coupling sides 47-49, 65, 66, and run parallel corresponding to the alignment lines F to the mobile device side/-s 75, which are disposed adjacently to the coupling mobile device side. This results in a preferred flush exterior circumference of the general layout, so that after affixing one or several such device components 30, 50, 70, the exemplary rectangular mobile device 20 also presents a general layout which has the rectangular shape.

Many kinds of constructive modifications can be implemented. Functional components can fulfill wholly different purposes, for example performing measurements when designed as sensors. The housings of the device components 30, 50, 70 do not have to be entirely enclosed, but can also feature open or partially open side walls in addition to potential openings and slits for plugs, cards and similar. In one instance, the receptor slot can be limited on one side by an adjacent wall of the housing of the mobile device affixed to it, or be laid out with the aid of adjacently coupled device component.

Figure 3:
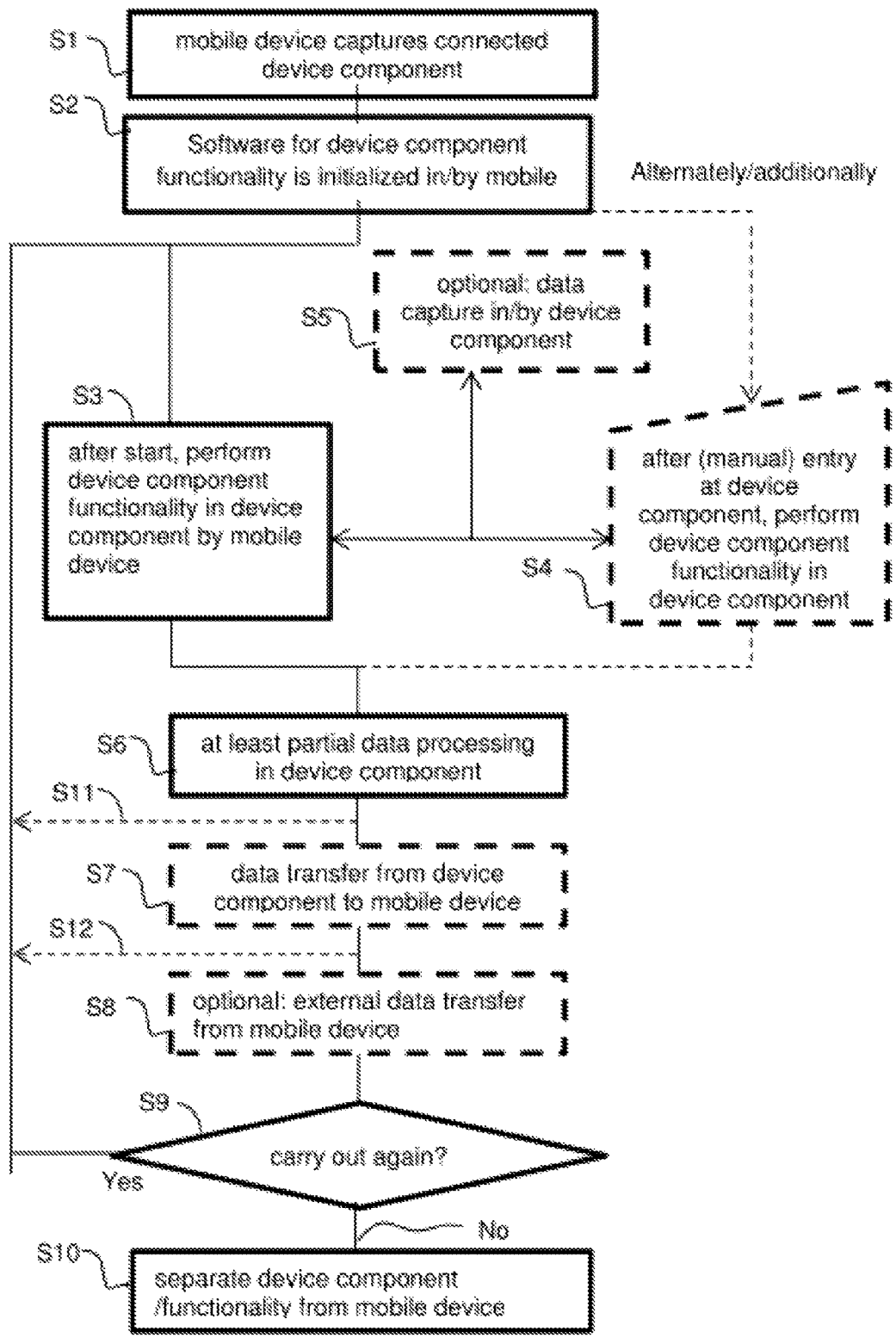
FIG. 3 is a flow chart of coupling a device component to a mobile device.

FIG. 3 shows an exemplary process of docking, coupling and/or activation of a coupled device component 30 at a mobile device 20. In a first step S1, the mobile device captures a device component affixed or coupled to it. The capture can be performed automatically and directly upon coupling the device component, or in case of a device component already being coupled, by activating appropriate software in the mobile device.

In the following step S2, software for a device component functionality of the device component is initiated in the processor of the mobile device or the processor of the device component.

In step S3, an appropriate device component functionality in the device component is performed after the mobile device and its processor initiates it. In another embodiment as shown in step S4, a device component functionality can also be performed in the device component upon manual entry into the device component. As the device component is equipped with a module or a device, which performs a signal and/or data capture in step S5, it can be activated in order to capture signals and/or data on a one-time or continuous basis. The captured signals or data, or other signals or data provided by the device component will be at least partially subjected to data processing in the device component in step S6. However, as an alternative, the processor of the mobile device could process the data completely.

In step S7, data transfer from the device component to the mobile device will be carried out in order to transmit the signals or data captured, or otherwise provided by the device component, to the mobile device. A particular option is provided in step S8, which performs external data transfer from the mobile device to other devices which are reachable remotely via radio interfaces or mobile radio systems. Subsequently, retrieval step S9 will be carried out, which will check whether the process should be performed continuously. If yes, it will step back to the step S3, S4 for the performance of device component functionality. If no, the device component and its functionality will be separated from the mobile device in step S10. Thereby, the separation can particularly be carried out data-wise in regard to software access or data exchange.

The retrieval with a step back can also be provided in step S11 after the partial data processing in the device component. Also, such a step back or jump back can be provided in step S12, which follows the data transmission from the device component to the mobile device.

Particularly, step S6 with data processing is advantageously modifiable. A partial or complete data processing and control of functional components of the device component with the aid of the processor in the mobile device allow the provision of technically simple device components, which significantly feature only the most necessary functional components and interfaces, as calculations and the performance of software-algorithms can be carried out in the existing processor of the mobile device.

The mobile device requires appropriate drivers and/or software, which are adapted to the functional components and functionalities of the device component in order to enable the processor of the mobile device to control the device components and/or to control the functional components in it, and/or to control the processor of the device component if existing, and/or to perform certain measures and exchange data and/or signals among each other. The provision of such driver and/or software for the mobile device is described based on an exemplary process per FIG. 4.

Figure 4:
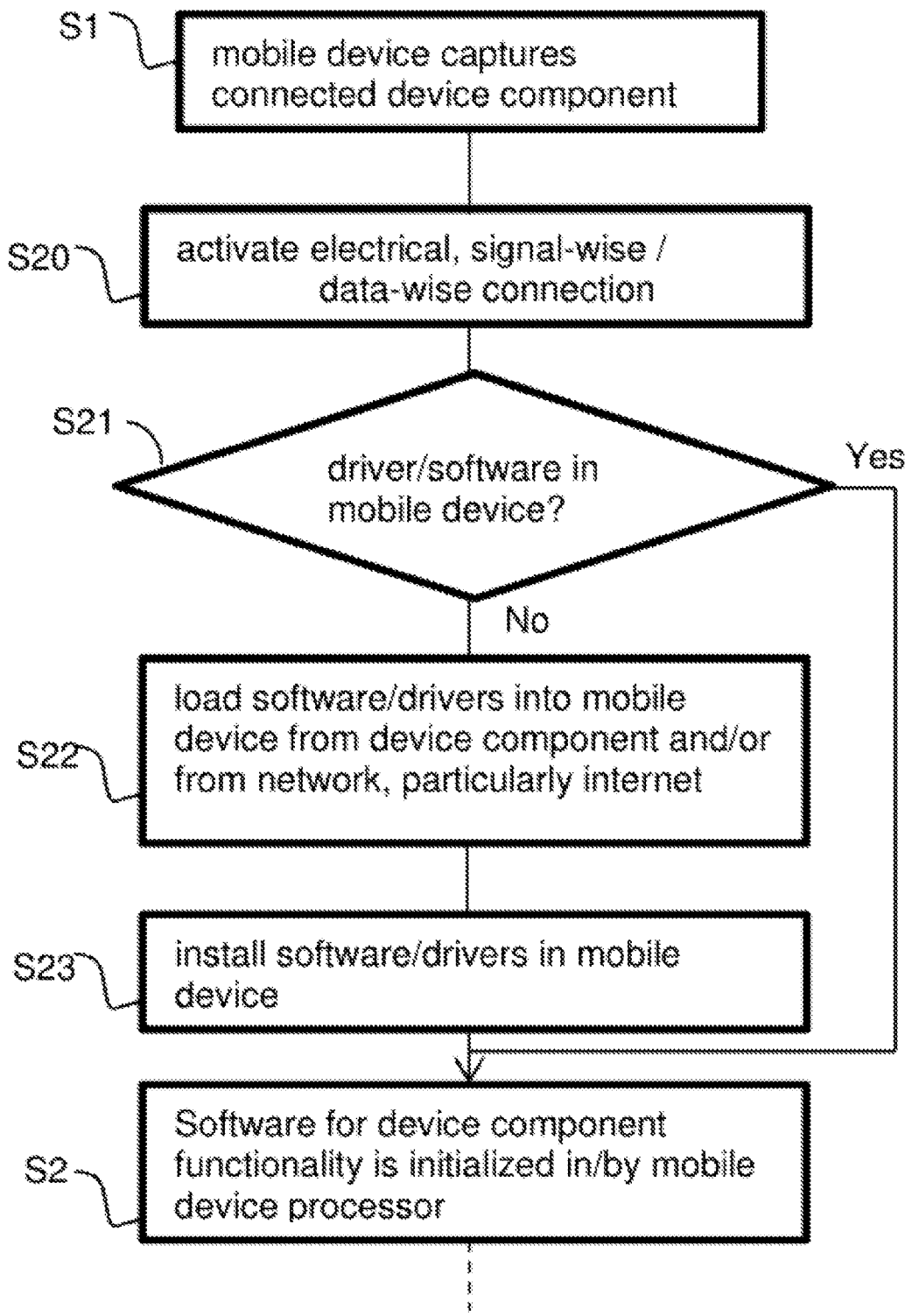
FIG. 4 is an additional flow chart presenting software installation in the mobile device.

In step S1 of FIG. 4, the mobile device captures an attached additional component such as a device component and functional components in the device component, whereby it can be performed automatically or upon user instruction.

Subsequent step S20 is used to activate an electrical, signal-wise and/or data-wise connection between the mobile device, the device component and the functional components in the device component. A device or functionality search can be performed automatically, which searches for corresponding properties in at least one device component and then automatically installs suitable drivers, or announces a selection of drivers, in order to enable a user to make a focused selection.

During subsequent retrieval step S21, it is ascertained whether suitable software or a suitable driver is available for a coupled device component/functional component or its certain selected functionality, in the mobile device. If yes, it will progress to the second step S2 per FIG. 3, in which software for performing the mobile device functionality is 770 initiated in the mobile device processor or by it.

If not, appropriate software and/or an appropriate driver will be loaded into the mobile device in subsequent step S22. The loading of driver and/or software can particularly be performed directly from a memory of the device component or from its functional components via the interface arrangements between the mobile device and the device component(s). Correspondingly, such an installation of the driver and/or software has to be performed during the initial coupling of a device component or a functional component to the mobile device, or to another, intermediately switched device component. This renders any unnecessary separately provided data carriers with corresponding drivers or software, or drivers to be downloaded from networks and/or software, in order to put the device component at the mobile device in service.

When subsequent activations are carried out, it is preferable to ensure that the software and/or drivers in the mobile device are sufficiently up to date. This is particularly possible by accessing the appropriate memories in a network, for example the Internet, by having the mobile device building up a suitable connection over the coupled networks and/or mobile radio systems.

In the following section, step S23, software and/or the driver will be installed in the mobile device and therewith made available to the user of the mobile device. The process will then progress to second step S2 per FIG. 3.

Particularly when utilizing a device component with a potentially high-performance processor, functionalities and processes can also be moved from the processor of the mobile device to a processor of the device component. It is advantageous to process signals and/or data provided in the device component by a processor of the device component and a subsequent transmission to the mobile device, so that after a very fast processing in the coupled device component, the processor of the mobile device can perform final processing and if required, an evaluation with lower processor power usage.

An additional modification that can be realized is that the spatial allocation in a device component is provided in a manner that the various components can be utilized in various ways. This enables numerous sensors and functions, which merely use a section of the device space and/or the external device component, to be arranged within one device component.

A device component designed in a modular fashion can for example provide numerous plug-in slots, which can have sensors, actuators, batteries and other functional elements plugged in and ultimately removed. For this purpose, the plug-in slots can be designed that one large plug-in slot can be used to plug in numerous components next or on top of each other, if required. This can particularly allow determining the geometry and electrical interfaces of plugged-in components, so that the sub-division allows for ½ +½, or ½+¼+¼ spatial proportions. Preferably, such embodiments should also particularly allow for replacements of individual components, if needed even during the running operation.

The concept of device components employs the idea of the majority of so-called smart phones having a removable rear cover in order to access the battery, SIM-card, SD-card, etc. Therewith, if the interior of the mobile device is equipped with an energy and/or communication interface, a device component with any desired hardware expansions can be coupled to the mobile device instead of the rear cover. It caused the mobile device to become thicker, but the mobile device is otherwise molded with the device component into a particularly seamless unit. The hardware expansion thus provided can be optionally fed by an additional battery of energy source such as fuel cells or a range from special sensors for medical applications, functional equipment or functional components for domain and/or industrial applications all the way to functional components comparable to a credit card terminal with credit card reading device, fingerprint scanner and integrated printer.

Thus, the device component is particularly a hardware expansion for a mobile device, whereby the mobile devices can assume the form of smart phones, mobile phones, tablet computers, laptops or other hand-held devices. The device component particularly comprises a unit of one or several processors, functions, sensors, actuators and/or communication interfaces.

In particular, the device component can be mounted to be utilized on the mobile device, set on top of it, affixed or connected to it and can then be removed from it. After mounting, setting on top of it, affixed or connected, the device component represents one unit with the mobile device, whereby the device component should preferably not overlap the edge of the mobile device and the device component preferably does not encompasses the mobile device, or only partially does so. The device component can be integrated visually and mechanically, but particularly seamlessly with the final device.

In another embodiment, the device component in the coupled mode covers or encompasses the mobile device at least partially on at least two or three sides of the mobile device.

Thus, the coupling device can be designed as a clip, which represents an independent component when not being installed or loose, and when it is in the coupled mode, encompasses the mobile device as well as the device component, and thus affixes them mechanically. It is also feasible to provide embodiments, which foresee the coupling device with a kind of clip, which is solidly affixed to a part of mobile device housing, or more preferably to a part of device component housing, and in the coupled mode encompasses and affixes the adjacent component, an adjacent mobile device and also a further device component.

Particularly in such embodiments, the element which embraces an additional side of the mobile device or an adjacent device component can also feature an interface arrangement maintaining contact with an interface arrangement, which is designed on a further side of the mobile device or the adjacent device component. The additional side would thereby e.g. be a narrow end wall of the mobile device and the additional side is adjacent particularly to a side of the mobile device or coupling side, which is comparably large.

In yet another embodiment, the coupling devices do not have to be exclusively hidden between the components coupled to each other, but can also be designed as visible clips on the side of the mobile device and additional device component exterior wall, in order to accomplish a mechanically rigid connection between the mobile device 20 and device component 30. An alternative or additional embodiment can also provide the coupling device in form of magnetic coupling elements.

In a further embodiment, the device component can be used separately from the mobile device. The device component can be used to carry out its independent measurements and its measurement values such as medical measurement values can be processed further after the subsequent coupling to the mobile device and/or transmitted to a remote station. List of reference numerals is shown in the table below:

| | |
|---|---|
| 10 | System of mobile device and device component |
| 20 | mobile device |
| 21 | Display and/or operation device |
| 22 | Battery |
| 23 | Identification card slot |
| 24 | Processor |
| 25 | Wiring |
| 26 | Coupling device of the mobile device |
| 27 | Interface arrangement, particularly plug |
| 28 | Wiring |
| 29 | Interface arrangement of the mobile device |
| 30 | First device component |
| 31 | First coupling device of the device component |
| 32 | First interface arrangement of the device component |
| 33 | Actuation element |
| 34 | Processor |
| 35 | First interface arrangement of the device component |
| 36 | Second coupling device of the device component |
| 37 | Second interface arrangement of the device component |
| 38 | Wiring |
| 39 | Second interface arrangement of the device component |
| 40 | Functional component, particularly memory-card slot |
| 41 | Functional component, particularly identification-card slot |
| 42 | Functional component, particularly additional battery |
| 43 | Receptor slot for cards |
| 44 | Functional component, particularly card-reading device for credit and debit cards |

-continued

| | |
|---|---|
| 45 | Card, particularly debit card |
| 46 | Side of mobile device |
| 47 | First coupling side |
| 48 | Second coupling side |
| 49 | First coupling side |
| 50 | Second device component |
| 51 | First coupling device of the device component |
| 52 | First interface arrangement of the device component |
| 54 | Processor |
| 55 | First interface arrangement of the device component |
| 56 | Second coupling device of the device component |
| 57 | Second interface arrangement of the device component |
| 58 | Wiring |
| 59 | Second interface arrangement of the device component |
| 60 | Functional component, particularly position determination device |
| 61 | Functional component, particularly medical analysis component |
| 62 | Receptor slot for testing strip |
| 63 | Sensor, particularly blood analysis sensor |
| 64 | Testing strip for blood analysis |
| 65 | Second coupling side |
| 66 | First coupling side |
| 70 | Third device component, particularly cover |
| 71 | First coupling device for device component |
| 72 | First interface arrangement for device component |
| 73 | Mechanical holding element |
| 74 | Notebook |
| 75 | Mobile device side adjacent to coupling side of mobile device |
| 76 | Side adjacent to coupling side of device component |
| 77 | Side adjacent to coupling side of device component |
| 78 | Side adjacent to coupling side of device component |
| 80 | Interface contacts for power/voltage supply |
| 81 | Interface contacts for signal/data transmission |
| 82 | Contact wiring |
| 83 | Interface contacts for power/voltage supply |
| 84 | Interface contacts for signal/data transmission |
| 85 | Contact wiring |
| D | Data, resp. signals |
| V | Voltage supply |
| x, y, z | Spatial coordinates |
| F | Alignment |
| S1-S12, S20-S23 | Process steps |

Exemplary Embodiment of an Adaptor of the Invention

In another embodiment, the present invention is an adaptor for an electronic communication device. This adaptor enables the electronic communication device to perform additional functions when the adaptor is connected to the electronic communication device.

Figure 5A:
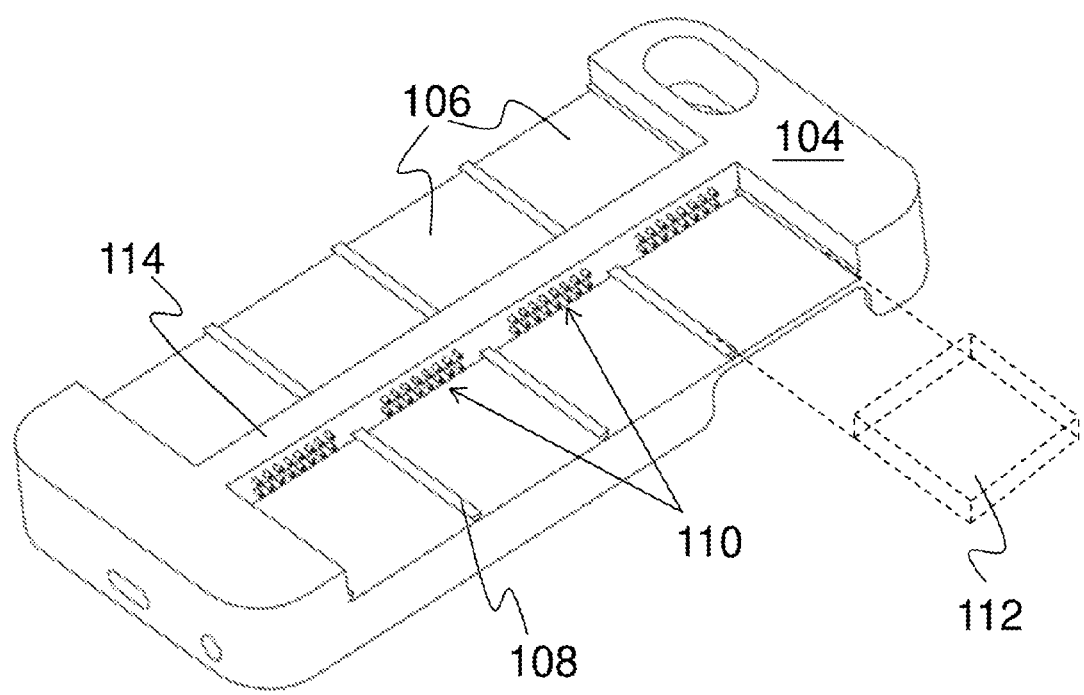
FIG. 5a is a perspective view of a frame of an adaptor of the present invention in an exemplary embodiment.
Figure 5B:
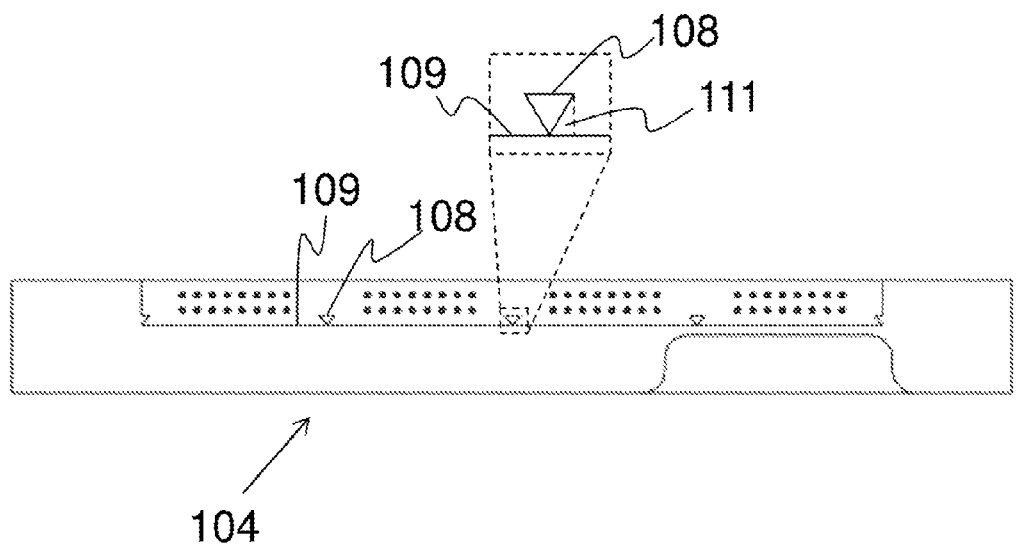
FIG. 5b is a side view of the frame of the adaptor in an exemplary embodiment.

Referring to FIGS. 5a to 5b, the adaptor according to this embodiment has a frame 104 with clips (not shown) on the two opposing ends that act as a fastening mechanism for coupling the frame 104 to the electronic communication device. There is a spine 114 in the centre of the frame 104 extending from one end of the frame 104 to the opposite end of the frame 104. The frame 104 has a plurality of docking areas 106. In this embodiment, there are eight docking areas. Four docking areas 106 extend from each side of the spine 114. Each docking area 106 has a space 112 with two sides of the space 112 defined by two rails 108 extending perpendicularly from the spine 114 that act as an anchoring mechanism. Each rail 108 has slots 111 provided between the rail 108 and the base 109 of the docking area 106. Four electrical interconnection sites in the form of pin connectors 110 are evenly disposed along the length at each side of the spine 114. The spaces 112 of the docking areas 106 all have the same size and shape, the relative dimension of which is shown by the dotted box in FIG. 5a for clarity of illustration.

Figure 6A:
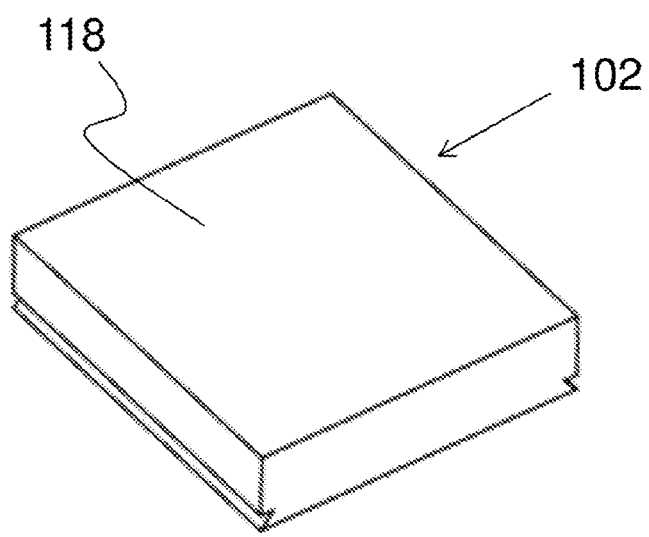
FIG. 6a is perspective view of a package in one embodiment.
Figure 6B:
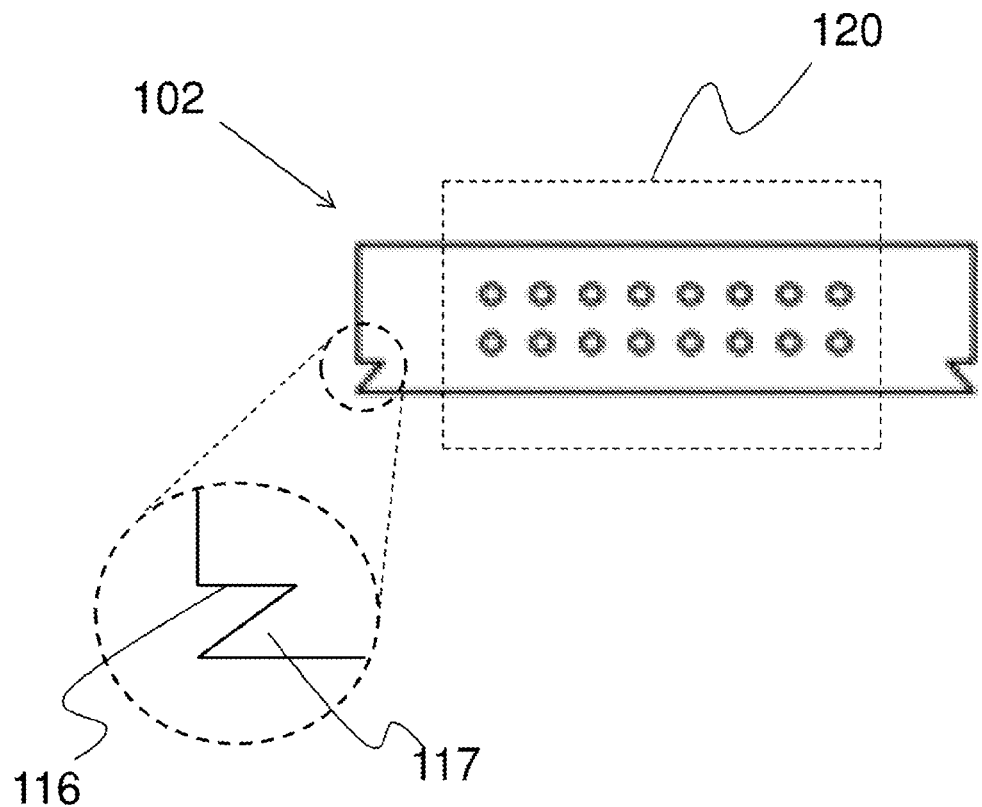
FIG. 6b is side view of the package showing its grooves, ledges (as example of attachment mechanism) and connection interface in an exemplary embodiment.

FIGS. 6a and 6b show one example of a package 102 with a housing 118, two ledges 117 disposed along the two sides that act as an attachment mechanism and two grooves 116 having a complementary shape to the rails 108. The slot 111 is complementary to the ledge 117 so that the package 102 can be slid along the rail 108 into the docking area 106 to become securely fastened. FIG. 6b also shows that the package 102 has a connection interface 120. The connection interface 120 contains a plurality of metal holes for electrically connecting to the pin connector 110 of the frame 104. In aid of the complementary locking between the rail 108, the groove 116 and the ledge 117 and the connection between the pin connector 110 and the connection interface 120, the packages 102 can be securely docked on the docking areas 106. This type of package 102 is referred to as a solo for ease of description.

Figure 7:
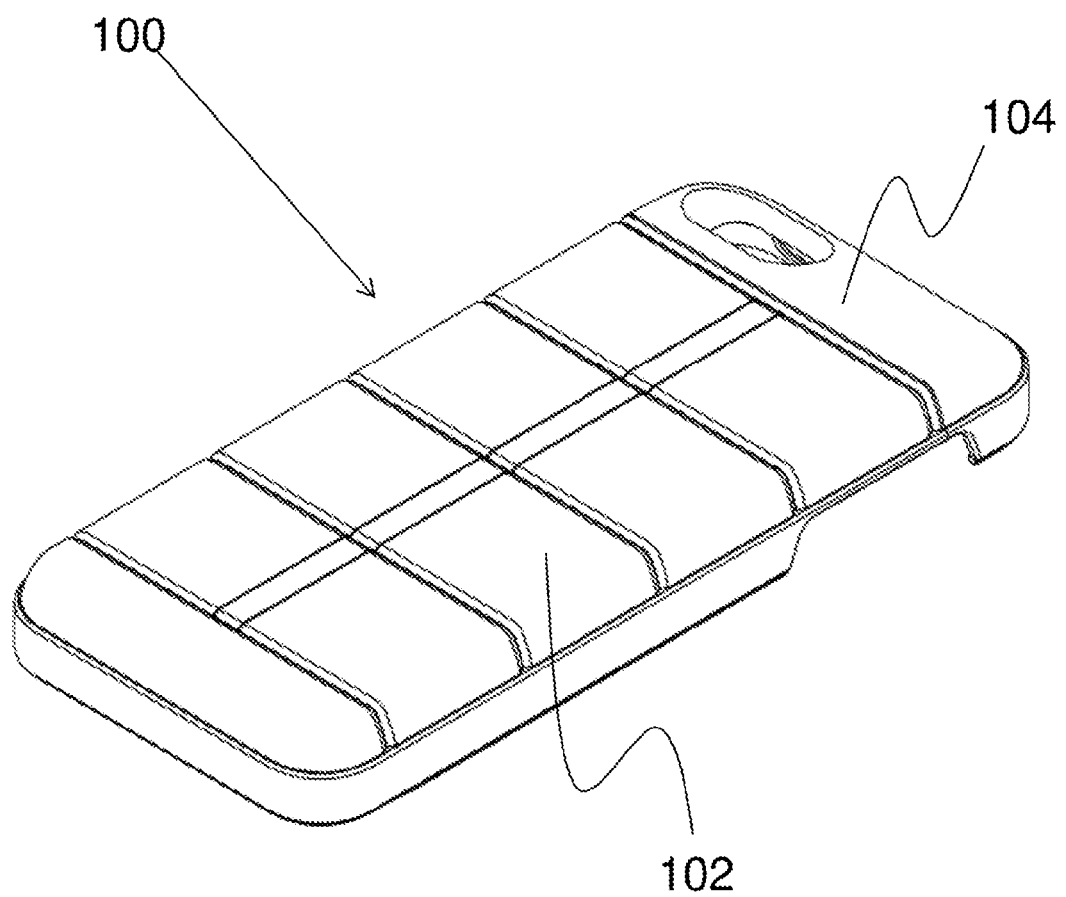
FIG. 7 is a perspective view of the adaptor in its fitted stage in an exemplary embodiment.

FIG. 7 shows the adaptor 100 in its fitted state. The adaptor 100 is formed by the frame 104 being slotted with 8 packages 102. Some of the packages 102 contain electronic components in its housing 118, which enable a desired function in the electronic communication device. The package 102 with electronic components therein is called an electronic package or active package. A user can add different functions by inserting different electronic packages into the frame 104, up to the maximum number of the docking areas 106. However, the user may just need one or two additional functions. To maintain the completeness of the adaptor 100, packages 102 with grooves 116, ledge 117 and connection interfaces 120 only but without functional electronics, can be used, and this type of packages 102 refer to dummy packages or passive packages.

Figure 8A:
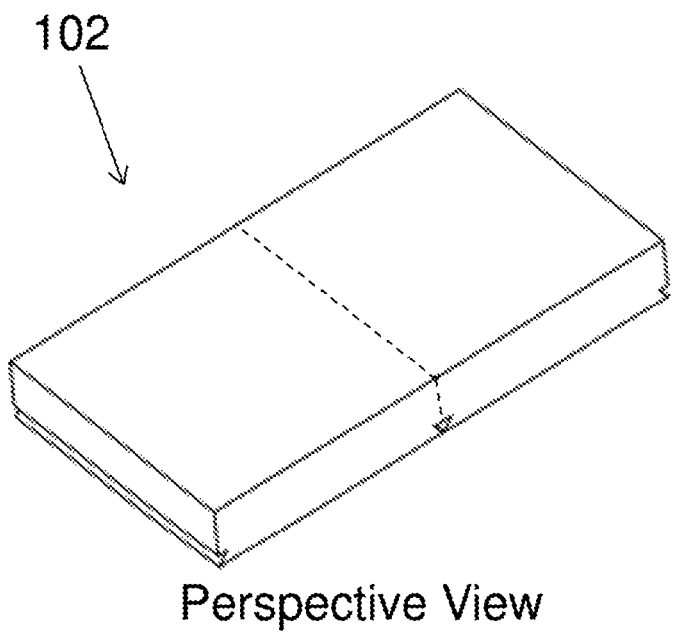
FIG. 8 shows different views of a double size package having twice the size of a single package in an exemplary embodiment.
Figure 8A:
Figure 8A:
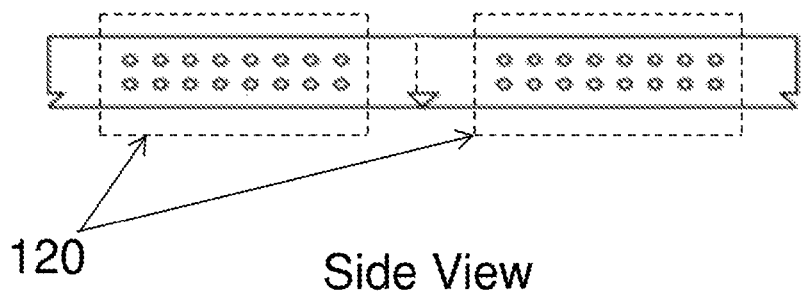
Figure 8B:
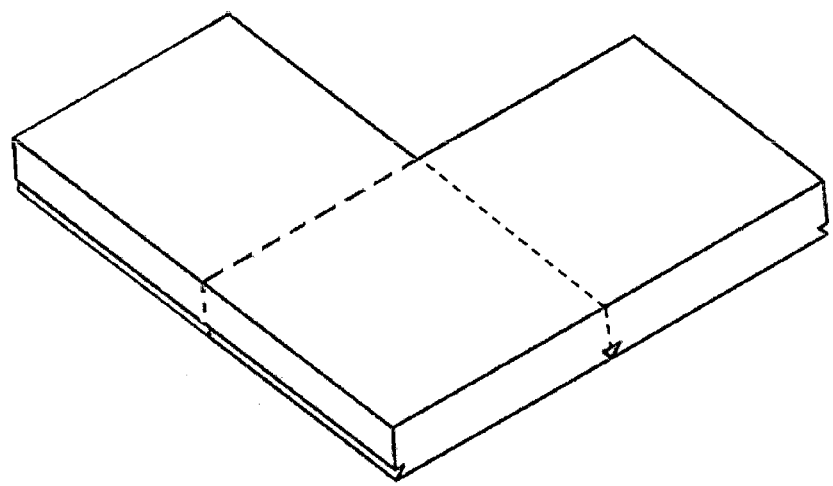
Figure 8C:
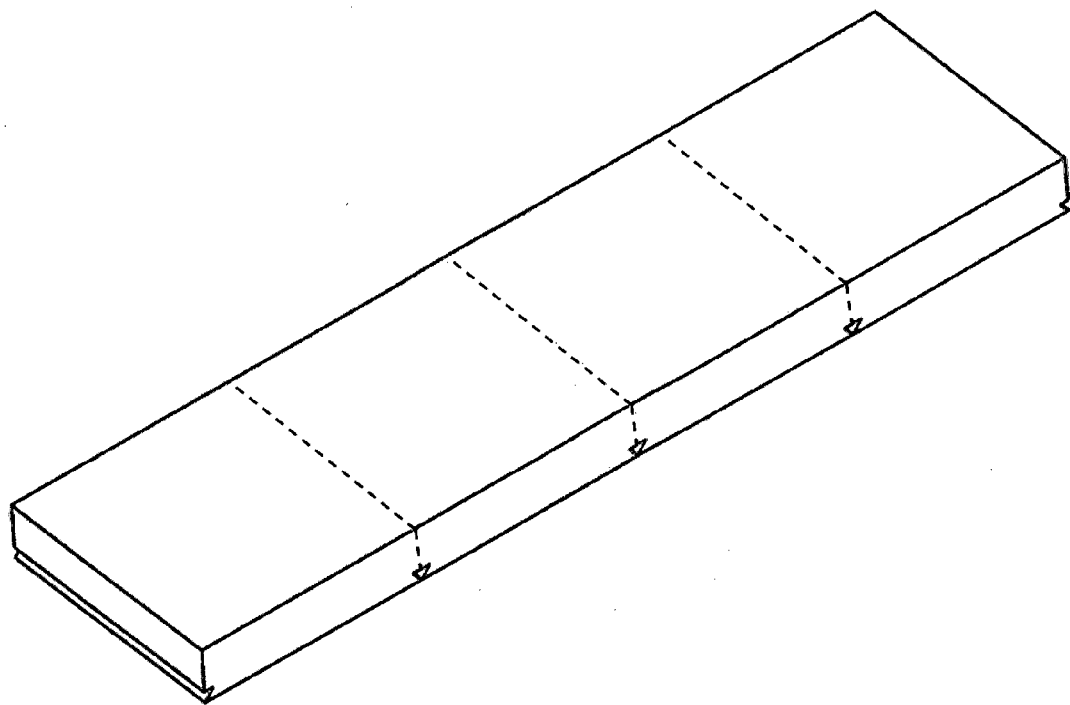

In general, to realize a complex function, more electronic components may be required to implement that function and the interconnection between various electronic components is relatively complicated, resulting in a larger size of the package 102. In order to house larger amount of electronic components, the package 102 can be made to have size and shape that are multiples of the predetermined size and the predetermined shape, e.g. a package that is double, triple or quadruple the size of a solo. Alternatively, the package 102 can be of a large size simply because of its nature, e.g. a battery package may have double or triple the size of a solo. An example of a double package 102 is shown in FIGS. 8a, b and c, which are double, triple and quadruple the size and shape of a solo respectively. The dotted line in the middle of the package 102 is only used to indicate that the size of a solo. This package 102 has two connection interfaces 120 for connecting to the pin connectors 110. For ease of description, the volume and shape and size of a solo is referred to as a "space unit". A package of multiple space units refers to a package having a volume, equals to a multiple of the size, while the shape is built on a solo, just like a Lego set but one which can be extended on different sides.

Figure 9:
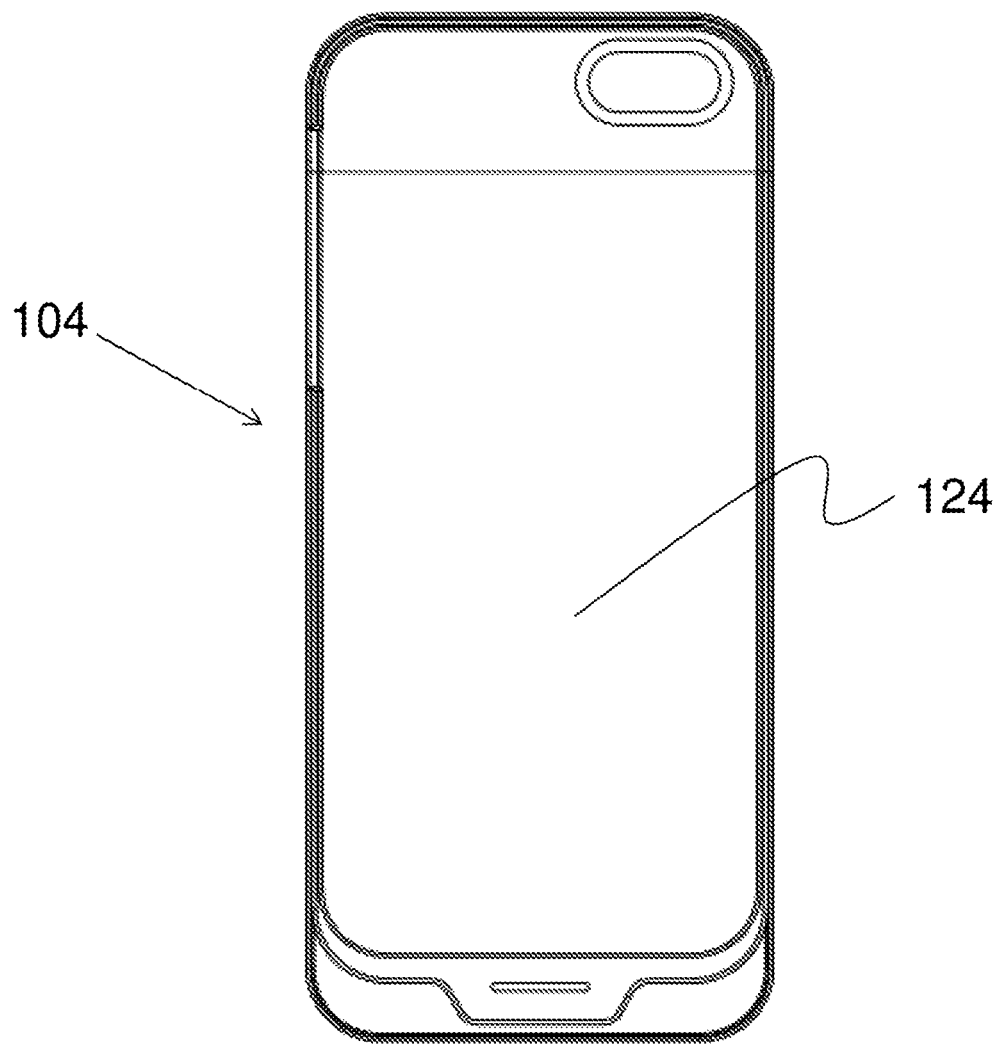
FIG. 9 is a front view of the frame in an exemplary embodiment.

In use, the frame 104 with dummy packages can be utilized as an adaptor 100. When in use, a user can snap the adaptor 100 onto an electronic communication device to add additional functions to the electronic communication device. Referring to FIG. 9, the front side of the frame 104 has a site 124 with a specific size for a specific type of electronic communication device to be snapped onto. The site 124 can be of different size and shape depending on different types/models of the electronic communication device. The frame 104 also has an electrical connector that act as a connection module for electrically connecting the frame 104 to the electronic communication device so that the frame 104 can communicate with the electronic communication device and ultimately communication between the packages 102 docked on the frame 104 and the electronic communication device can be established. The electrical connector can be a micro USB connector, 30-pin dock connector, lightning connector, 24-pin dock connector and portable digital media interface, etc., depending on the interface used by the electronic communication device. The use of the electrical connector in the frame 104 is optional. If an electrical connector is not used, the frame 104 will be installed with wireless equipments for establishing a wireless communication with the electronic communication device. The wireless communication can be achieved by Bluetooth, Near Field Communication (NFC), Zipbee, WiFi, or infrared, etc. that acts as the connection module. Once the communication between the frame 104 and the electronic communication device is established, either by wired means or wireless means, the packages 102 docked on the frame 104 and the electronic communication device can communicate with each other. In a preferred embodiment, the electronic packages, i.e. packages 102 with electronic components, are installed with compatible software drivers (hereafter referred to as driver) so that the electronic packages can function immediately upon connection to the electronic communication device via the frame 104. In another embodiment, the electronic packages are not pre-installed with drivers and the electronic communication device needs to download the relevant drivers from the Internet or through external devices. The electronic packages, in one embodiment, are not equipped with processors and this kind of electronic packages serve as add-on hardwares to the electronic communication device. This kind of electronic packages are under control by the processor of the electronic communication device and are to receive instruction from the processor of the electronic communication device to realize desired functions. In yet another embodiment, the electronic packages are equipped with processors and can perform the desired functions independently of the processor of the electronic communication device. It is clear that the processing speed of the electronic communication device will be slowed down if more functions have to be performed by the processor of the electronic communication device. If the electronic packages have their own processors and can run independently, they may not need to draw upon the processing power of the electronic communication device and hence the latter can still run smoothly but perform additional functions. When the functions of the electronic packages are not used, the processors of the electronic packages can serve as secondary processing units or co-processors for the electronic communication device, thus resulting in a better performance. On the other hand, the processor of the electronic package and the processor of the electronic communication device can be programmed to work cooperatively together to perform the additional function, thus speeding up the overall process.

In a further embodiment, the present invention utilizes an identification system. Each electronic package has a unique identity number so that the electronic communication device can identify each electronic package linked thereto. In one embodiment, the unique identity number is an equivalent to the MAC number which is used to identify Ethernet devices on the internet, the frame 104 also has a unique identity number for recognition by the electronic communication device. With the identification system, the electronic communication device can selectively communicate with different electronic packages and send instructions to corresponding electronic packages accurately. The identification system also facilitates information exchange between different electronic packages and frames 104. Once the adaptor is connected to the electronic communication device, the identity numbers of the frame 104 and the electronic packages are recognized and stored by the electronic communication device, and the data captured by different electronic packages is associated with the identity numbers for ease of data exchange between different electronic packages, frames 104 or electronic communication devices.

As required by the user, different packages 102 with different functions can be inserted into the frame 104. If not all docking areas 106 are filled with electronic packages, dummy packages can be used to fill the remaining docking areas 106. When the user wants to add a new function, the dummy package can be replaced by an electronic package. In addition, the active packages and passive packages are exchangeable. If a specific function is not desired anymore, the electronic package with that specific function can be replaced by another electronic package with a different function. The electrical interconnection sites of the frame 104 are interconnected to each other. This allows direction communication and data exchange between various electronic packages which are docked on the docking areas 106. Some specific functions, such as climate analysis, may need different data, e.g. temperature, humidity and pressure etc., to complete the analysis. An electronic package may only have one analysis function. To perform the climate analysis, other electronic packages with different sensors can be used to collect the necessary data. An analysis system is formed by combining an electronic package with analysis function and electronic packages with different sensors. By combining and linking various electronic packages together, different complex functions can be achieved. This is another way to implement complex functions other than making a double, triple or quadruple the size of a solo.

In another embodiment, the electronic package has electronic components only but without power supply and thus the electronic package is electrically driven by the electronic communication device. In yet another embodiment, the frame 104 contains a power supply and the electronic package will be electrically driven by the frame 104. In yet another embodiment, the electronic package is an external battery which serves as a power supply to the other electronic packages and an additional power supply to the electronic communication device.

The functions of the electronic packages can be selected by the user include, but not limited to, blood-work determination, card reading, breath and/or blood alcohol analysis, physical and/or chemical values detection and analysis, electrical measurement, temperature measurement, pressure measurement, gas measurement, humidity and/or liquid detection, image-generation, data cryptography, data printing, fingerprint scanning, acceleration measurement, roughness measurement, position measurement, disposition and/or distance measurement, light flash, laser emission, etc.

Data collection is important nowadays since the data collected can be used for analysis of human behavior, environmental research, future trend prediction and decision making, etc. The packages 102 with various sensors are able to record data and store the data in their own memory. The data in the packages 102 is encrypted for security reason. Even though the packages 102 are connected to the electronic communication device, the data stored therein cannot be accessed by the electronic communication device. This setting is preset and may be changed by an authorized person or via a security key provided by the manufacturer. If the user is authorized to access the data, he/she can copy the data to the electronic communication device. If the electronic communication device is accessible to the Internet, the data can be uploaded to a centralized server for analysis or subsequent manipulation. As an example, an electronic package can be used to capture physiological data of a user or environmental data nearby. The data collected can be uploaded to a cloud sever for monitoring purposes or analyzing purposes if the user is healthy or determining the environmental pollution level. The data can be also shared among different organizations but the personal information will not be disclosed if the person doesn't choose to disclose. The personal information will be disclosed if the user/person chooses them to be disclosed.

Another Exemplary Embodiment of an Adaptor with a Different Configuration

Figure 10:
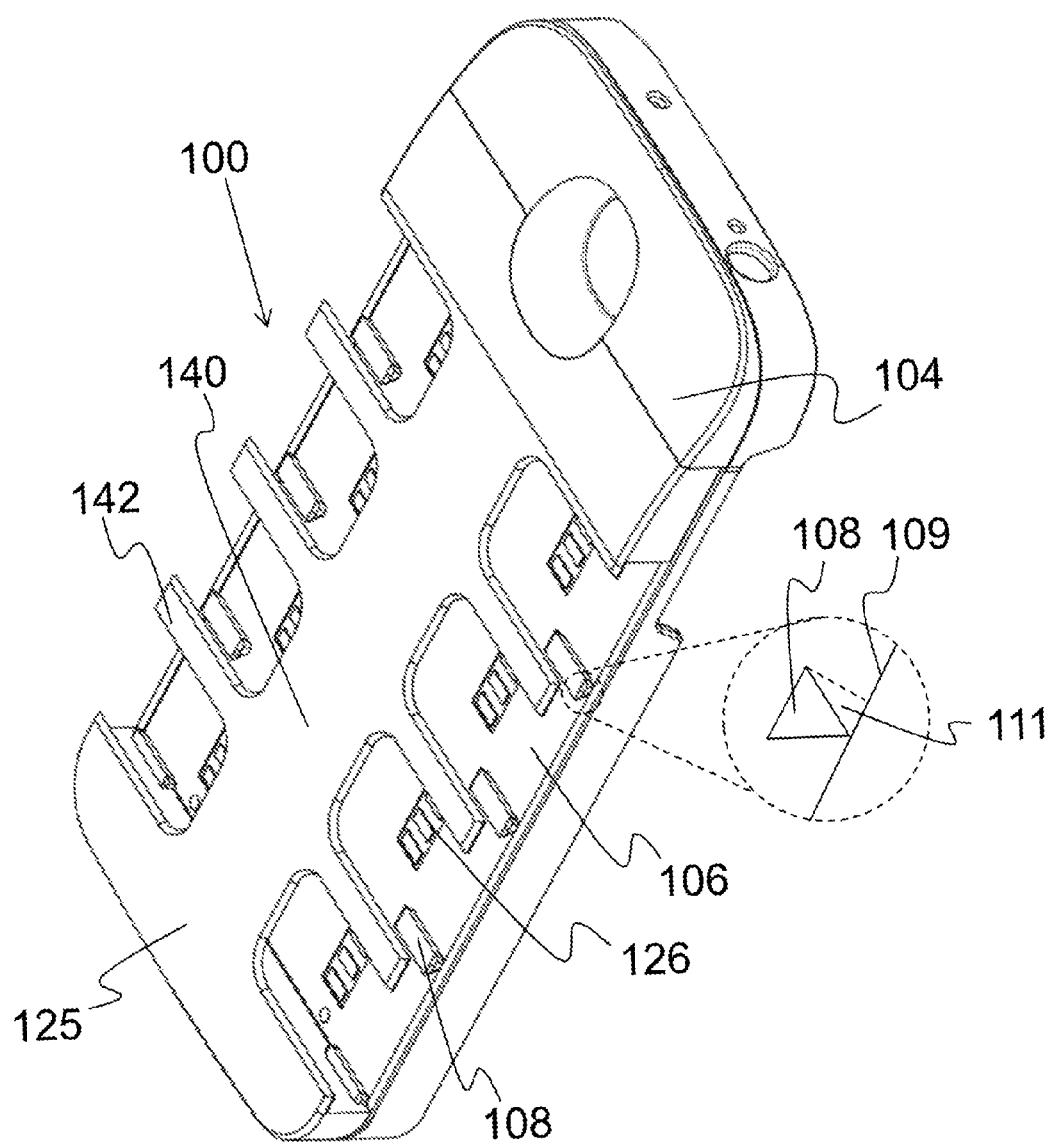
FIG. 10 is a perspective view of the frame of the adaptor in another exemplary embodiment.
Figure 11A:
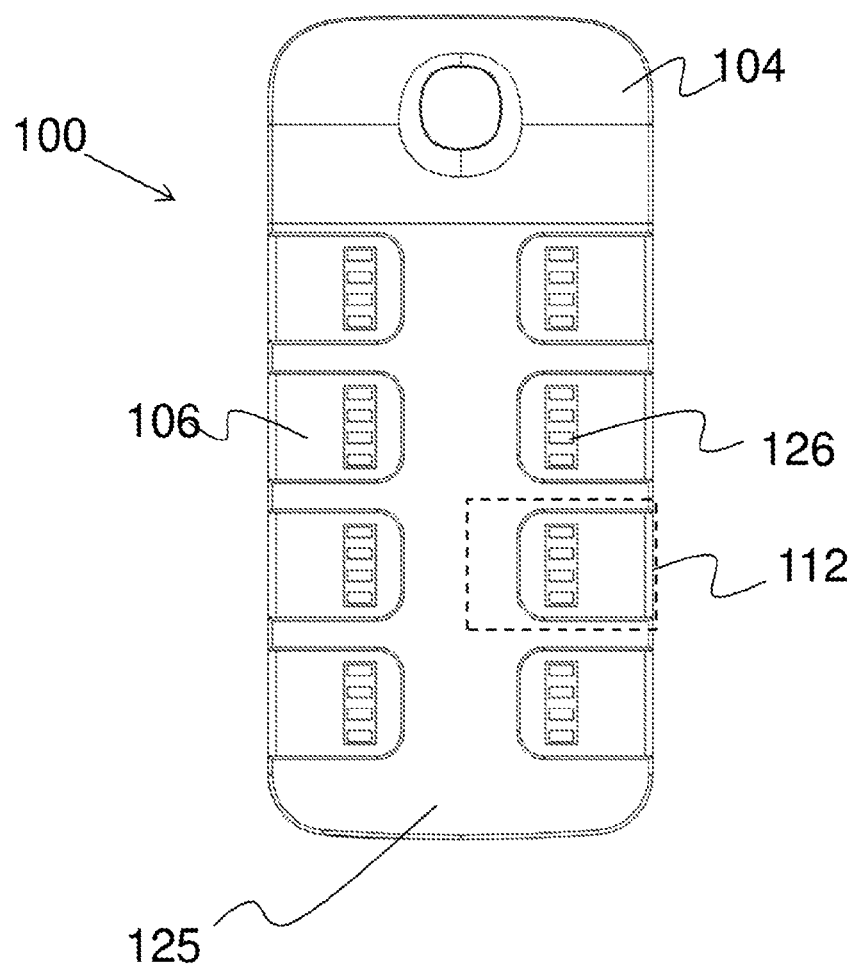
FIG. 11a is a front view of the frame of the adaptor in another exemplary embodiment.
Figure 11B:
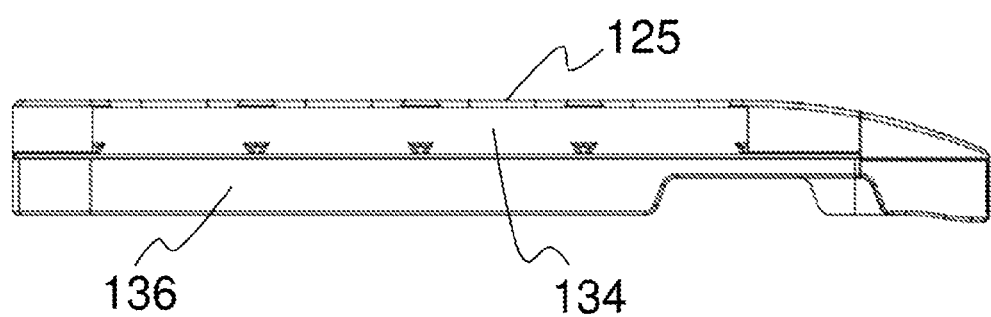

FIGS. 10, 11a and 11b show a different configuration of an adaptor 100 according to another embodiment of this invention. The frame 104 of this adaptor 100 has opposing end portions connected by two parallel flat panels extending therebetween. An empty area 134 is provided between the two panels. A solid piece 136, acting as the first panel, extends across the two ends with multiple spaces 112, one of which is shown as a dotted rectangle in FIG. 11a. In the centre of each space 112, there is a metal contact 126 acting as the electrical interconnection site. The second panel is shaped into the general shape of a fishbone 125 with a pillar 140 and a plurality of rib extensions 142 extending evenly from the pillar 140 defining caves therebetween. In the middle between each space 112 are rails provided at the edge of the solid piece 136 that run parallel and directly opposite the rib extensions 142. The empty room between a cave and a metal contact 126 generally defines the location of a docking area 106. The advantage of this configuration is to enable having multi-packages of more than four space units (only four docking areas are available on one side of the spine). For instance, it enables the user to use a package up to eight space units using the configuration of FIGS. 10, 11a and 11b.

Figure 12A:
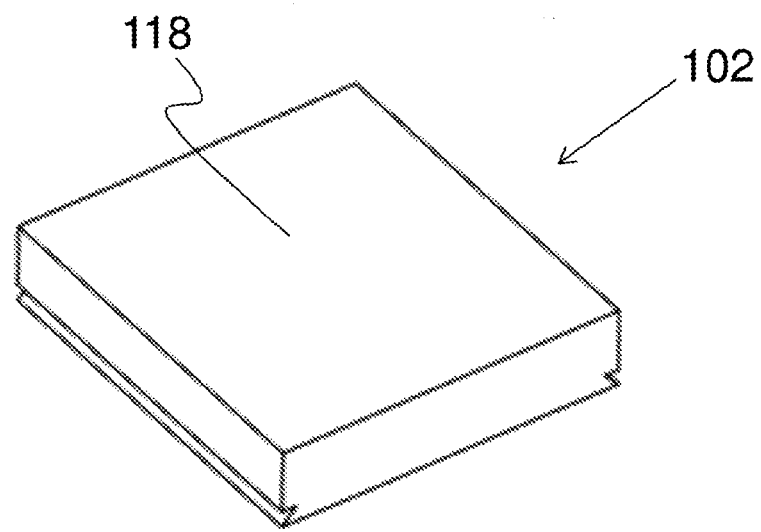
FIG. 12a is a perspective view of the package in another exemplary embodiment.
Figure 12B:
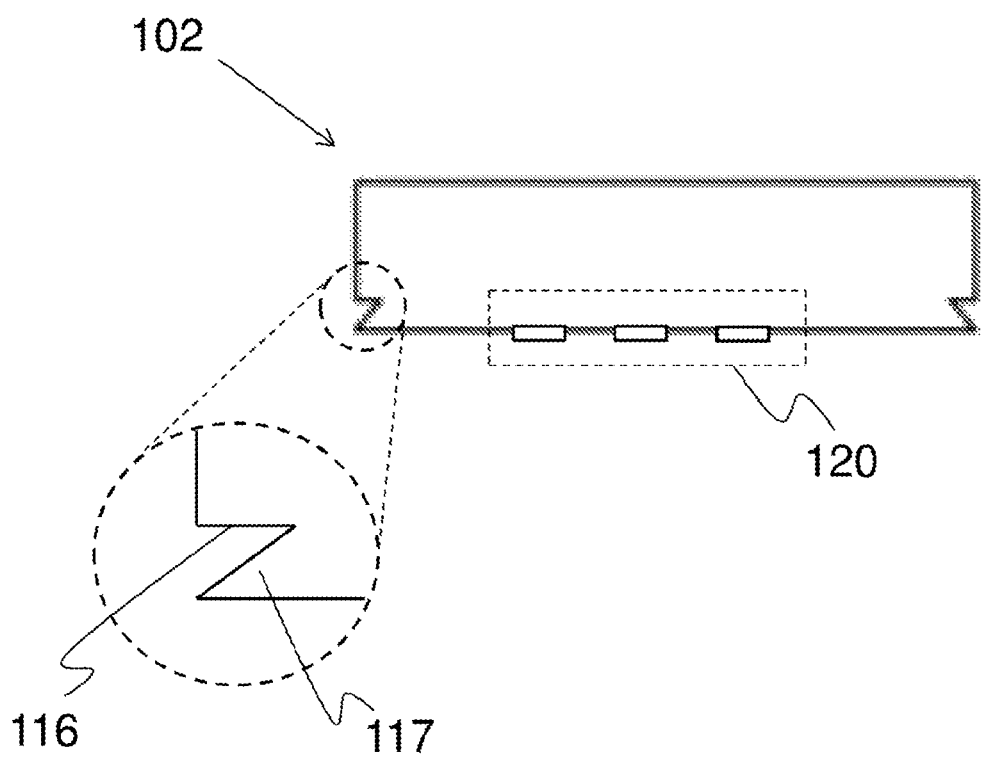
FIG. 12b is a side view of the package showing its grooves and ledges in another exemplary embodiment.

In this embodiment, as shown in FIGS. 12a and 12b, the package 102 with a housing 118 also has two ledges 117 disposed along the two sides that act as an attachment mechanism and two grooves 116 having a complementary shape to the rails 108. The slot 111 is complementary to the ledge 117 so that the package 102 can be slid along the rail 108 into the docking area 106 to become securely fastened. A connection interface 120 is disposed in the bottom of the package 102.

Figure 13A:
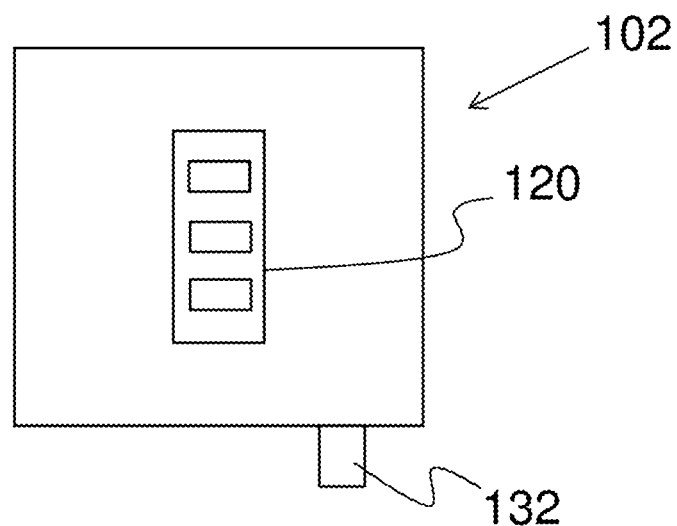
FIG. 13a is a bottom view of the package with a connection interface in another exemplary embodiment.
Figure 13B:
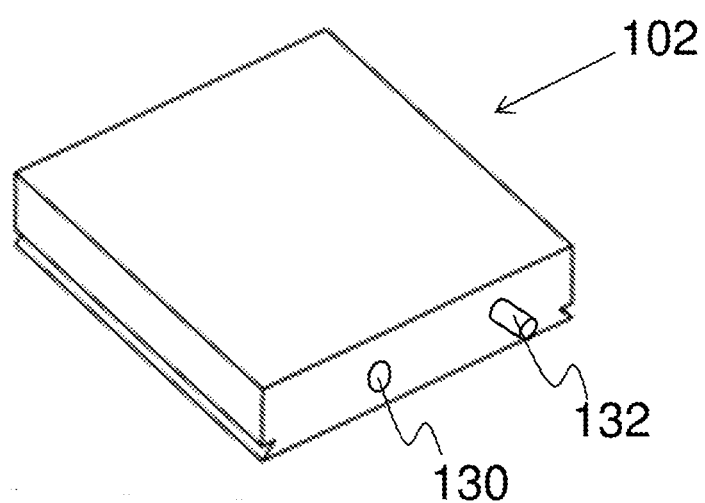
FIG. 13b is a perspective view of the package with a hole and a rod in another exemplary embodiment.

Referring to FIGS. 13a and 13b, the connection interface 120 in the bottom side of the package 102 is a complementary metal contact for electrical connection with the metal contact 126 of the docking area 106. As the fishbone 125 is a just flat cover, in order to fasten the package 102 more securely, the end side of the package 102 can have a hole 130 and a rod 132 extending outward and perpendicular to the surface of the end side. Another package 102 can have the same hole 130 and rod 132 but the locations of which are interchanged so that these two packages 102 can form a steady locking when plugged together.

In addition to the difference of the mechanical configuration, the adaptor 100 in this embodiment has the same function and usage as that described in the previous embodiment. The corresponding description is not repeated here.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, the number of the docking areas 106 is 8 in the exemplary embodiments but it is clear that it can be of any number depending on the needs and usage, e.g. 2, 3, 4, 5, 6, 7, 8, 12, 16, etc. The package 102 can also have a display unit thereon for displaying parameters. In general, a package 102 with double size of a solo has two connection interfaces 120 and a package 102 with triple size of a solo has three connection interfaces 120, and so on. However, the number of connection interfaces 120 can be varied. For example, a package 102 with quadruple size of a solo can have 1, 2, 3 or 4 connection interfaces 120. The need of multiplicity of the connection interface 120 depends on the electronic functions and needs of the packages 102 and can be determined by a manufacturer accordingly.

In addition, the fastening mechanism of the frame 104 is optional. The frame 104 can be completely separated from the electronic communication device and the communication between the frame 104 and the electronic communication device can be achieved by both wired and wireless means.

Furthermore, rails are used as the anchoring mechanism of the docking areas in the aforementioned embodiments. However, other means could also be used, for instance magnetic coupler and pneumatic coupler. Moreover, pin connectors with circular pins are used as the electrical interconnection site of the docking areas in the aforesaid embodiments. Other connectors, for instance pin connectors with other shapes of the pin/pin holes, pin sticks and card edge connectors, could also be used.

Moreover, the packages mentioned in above embodiments are square in shape. However, it is clear for one skilled in the art to manufacture packages with other shapes, for instance parallelogram and triangle. It will also be clear that other elements of the adaptor, for instance the anchoring mechanisms and electrical interconnection sites, would adjust its geometry and orientation according to the packages used. Furthermore, the adaptor can be adopted to couple to any portion of the electronic communication device, but preferably at the rear side of the electronic communication device.

What is claimed is:

1. An adaptor for an electronic communication device, comprising a frame which comprises:
   (a) a connection module for connecting said frame to said electronic communication device; and
   (b) a plurality of docking areas disposed on said frame, each said docking area comprising:
      (i) a space having a space unit with a predetermined size and a predetermined shape;
      (ii) an anchoring mechanism; and
      (iii) an electrical interconnection site;
   wherein said space is adapted to receive a package with an attachment mechanism for docking with said frame via said anchoring mechanism; wherein said package having a size and shape of at least one of said space unit; wherein said electrical interconnection site is configured to couple with said package when said package is docked with said docking area, wherein said connection module is configured to establish connection interface between said package and said electronic communication device; wherein said adaptor provides universal docking of said packages thereby enabling a user to add at least one desired function to said electronic communication device.

2. The adaptor of claim 1, wherein said frame further comprises a fastening mechanism configured to couple said adaptor to said electronic communication device.

3. The adaptor of claim 1, wherein said connection module is an electrical connector or a wireless connection module; wherein said wireless connection module is Bluetooth module, Zipbee module, near field communication module, Wi-Fi module or infrared module.

4. The adaptor of claim 1, wherein said frame further comprises:
   (a) a spine extending from one end of said frame to an opposite end of said frame; and
   (b) a plurality of rails extending perpendicularly from said spine;
   wherein two consecutive rails define two sides of said space and act as said anchoring mechanism of said docking areas.

5. The adaptor of claim 4, wherein said electrical interconnection sites are disposed along a length of said spine; each of said interconnection sites further comprises at least one electrical connector; each of said package further comprises a metallic portion configured to connect to said electrical connectors.

6. The adaptor of claim 5, wherein said electrical connectors are selected from a group consisting of card edge connector, slider connector, pin connector and flat connector.

7. The adaptor of claim 1, wherein said frame further comprises:
   (a) a first flat panel extended from one end of said frame to and opposite end of said frame; and
   (b) a plurality of metal contact portions disposed on said first flat panel;
   wherein said metal contact portions being said electrical interconnection site of said docking area and said anchoring mechanisms are disposed on said first flat panel.

8. The adaptor of claim 7, wherein said anchoring mechanisms are selected from a group consisting of rails, pneumatic connector and magnetic connector.

9. The adaptor of claim 7 further comprising a second flat panel being parallel to said first flat panel; wherein said docking area being a portion of an empty space between said first flat panel and said second flat panel.

10. The adaptor of claim 9, wherein said second flat panel is in a general shape of a fishbone.

11. A package adapted for coupling to at least one of a plurality of docking areas of a frame; said frame being a part of an adaptor that is able to be connected to an electronic communication device and is capable of adding at least one desired function to said electronic communication device via said adaptor, each of said docking areas having a space with a space unit with a predetermined size and a predetermined shape, said package comprising:
   (a) a housing comprising an attachment mechanism for coupling to said at least one docking area of said frame;
   (b) electronic components housed within said housing for realizing said desired function; and
   (c) a connection interface for electrically connecting said package to said frame;
   wherein said housing has size and shape of at least one of said space unit so that different volume and amounts of said electronic components are able to be housed therein to provide maximum flexibility by allowing the same frame to be used for different said packages of multiple sizes having varying functionalities.

12. The package of claim 11 further comprising a processor configured to control said electronic components, wherein said processor of said package is configured to run independently of a processor of said electronic communication device to realize said desired function by using resources of said electronic communication device for interaction with a user.

13. The package of claim 12, wherein control of said electronic components is switchable between said processor of said electronic communication device and said processor of said package.

14. The package of claim 11 further comprising a processor which run cooperatively with a processor of said electronic communication device to speed up processing time of different tasks of said electronic communication device or said desired function of said package.

15. The package of claim 14, wherein said processor of said package is further configured to work cooperatively with another processor of another package or another processor of another electronic communication device, and make use of resources from said another package and said another electronic communication device, thereby forming a multi-processor system.

16. The package of claim 11 further comprising:
    (a) a plurality of sensors housed within said housing and configured to measure physiological data of a user and environmental data; and
    (b) a storage unit configured to store said physiological data and said environmental data.

17. The package of claim 16 further comprising a data communication module housed within said housing and configure to send said physiological data and said environmental data to a centralized cloud server for analysis or sharing upon connection with said electronic communication device that is linked to a data communication network.

18. The package of claim 11, wherein said desired function is blood-work determination, card reading, temperature measurement, humidity measurement, liquid detection, image generation, cryptography, fingerprint scanning, light flash, position measurement, storage extension, battery extension or laser emission.

19. The package of claim 11 further comprising:
    (a) a pin extending outwardly and perpendicular to a surface of an end side of said package; and
    (b) a hole extending inwardly and perpendicular to said surface of said package;
wherein said pin and said hole are configured to couple with a hole and a pin of another package respectively; thereby from a steady locking therebetween.

20. The package of claim 11, wherein said connection interface is a card-edge type of connector.

21. A method for adding desired functions to an electronic communication device, comprising:
    I. providing an adaptor comprising a frame which further comprises:
        (a) a connection module for connecting said adaptor to said electronic communication device; and
        (b) a plurality of docking areas disposed on said frame, each of said docking area comprising:
            (i) a space with a space unit with a predetermined size and a predetermined shape;
            (ii) an anchoring mechanism; and
            (iii) an electrical interconnection site;
    II. providing at least one package with an attachment mechanism for docking with said frame via said anchoring mechanism; said package further having size and shape of at least one space unit, wherein said package further comprises electronic components for realizing said desired function;
    III. inserting said at least one package into said docking area via said anchoring mechanism;
    IV. electrically connecting said at least one package to said frame;
    V. establishing a connection between said at least one package and said electronic communication device via said connection module; and
    VI. realizing said desired function in said electronic communication device;
    whereby a user can increase the functionalities of said electronic communication device with maximum flexibility and efficiency.

22. A method for providing at least one desired function to an electronic communication device by providing a frame, said frame being a part of an adaptor configured to be connected with said electronic communication device and is capable of adding at least one desired function to said electronic communication device via said adaptor, said frame further comprising a plurality of docking areas, each of said docking areas comprising a space having a space unit of a predetermined size and a predetermined shape, and anchoring mechanism and an electrical interconnection site, comprising the steps of:
    (a) selecting a desired function to be added to said electronic communication device;
    (b) selecting components that are required to realize said desirable function;
    (c) determining amount of space required to hold said components;
    (d) selecting a package housing having an internal volume larger than said amount of space, said package housing further having a size and a shape of at least one of said space unit; said package housing further comprising an attachment mechanism for docking with said frame via said anchoring mechanism;
    (e) assembling said components into said package housing thereby form a package;
    (f) establishing an connection interface between said package and said electronic communication device via said electrical interconnection site; and
    (g) realizing said desired function in said electronic communication device;
whereby a user can increase the functionalities of said electronic communication device with maximum flexibility and efficiency.

* * * * *